(12) United States Patent
Kuwayama et al.

(10) Patent No.: US 9,457,871 B2
(45) Date of Patent: Oct. 4, 2016

(54) BICYCLE FRONT DERAILLEUR

(71) Applicant: Shimano Inc., Sakai, Osaka (JP)

(72) Inventors: Kazuya Kuwayama, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 123 days.

(21) Appl. No.: 14/479,782

(22) Filed: Sep. 8, 2014

(65) Prior Publication Data

US 2016/0068225 A1    Mar. 10, 2016

(51) Int. Cl.
| | | |
|---|---|---|
| *F16H 9/00* | (2006.01) | |
| *F16H 59/00* | (2006.01) | |
| *F16H 61/00* | (2006.01) | |
| *F16H 63/00* | (2006.01) | |
| *B62M 9/137* | (2010.01) | |
| *B62M 9/1342* | (2010.01) | |

(52) U.S. Cl.
CPC ........... *B62M 9/137* (2013.01); *B62M 9/1342* (2013.01)

(58) Field of Classification Search
CPC  B62M 9/1342; B62M 9/137; B62M 9/1348; B62M 9/136; B62M 9/1344
USPC ...................................... 474/82, 80
See application file for complete search history.

(56) References Cited

U.S. PATENT DOCUMENTS

| | | | | |
|---|---|---|---|---|
| 4,194,409 A * | 3/1980 | Nagano | ................ | B62M 9/136 474/80 |
| 4,279,605 A * | 7/1981 | Egami | .................... | B62M 9/135 474/82 |
| 4,362,522 A * | 12/1982 | Huret | ................... | B62M 9/1342 474/82 |
| 4,424,048 A * | 1/1984 | Shimano | ................ | B62M 9/137 474/82 |
| 4,452,593 A * | 6/1984 | Coue | .................... | B62M 9/1242 414/917 |
| 4,479,787 A * | 10/1984 | Bonnard | .............. | B62M 9/1342 474/127 |
| 4,486,182 A * | 12/1984 | Coue | .................... | B62M 9/1342 474/78 |
| 4,617,006 A * | 10/1986 | Nagano | ................ | B62M 9/1342 474/78 |
| 4,674,995 A * | 6/1987 | Iwasaki | .................. | B62M 9/136 474/80 |
| 5,037,355 A * | 8/1991 | Kobayashi | ........... | B62M 9/1342 474/82 |
| 5,104,358 A * | 4/1992 | Kobayashi | ........... | B62M 9/1342 474/82 |
| 5,312,301 A * | 5/1994 | Kobayashi | ............. | B62M 9/136 474/140 |
| 5,496,222 A * | 3/1996 | Kojima | ................ | B62M 9/1342 474/80 |
| 5,816,966 A * | 10/1998 | Yang | ...................... | B62M 9/137 474/82 |
| 6,093,122 A * | 7/2000 | McLaughlin | ........ | B62M 9/1242 474/80 |

(Continued)

*Primary Examiner* — Henry Liu
(74) *Attorney, Agent, or Firm* — Global IP Counselors

(57) ABSTRACT

A front derailleur is provided with a base member, a linkage assembly, a chain guide, an input link, a connecting link and an outer casing receiving part. The linkage assembly includes a first link coupled to the base member at a first pivot axis, a second link coupled to the base member at a second pivot axis, and an extension link coupled to the first link and the base member. The chain guide is coupled to the first and second links. The input link, is supported relative to the base member about a third pivot axis, and connects to an operation cable. The connecting link is connected to the input link about a fourth pivot axis and to the extension link about a fifth pivot axis. The outer casing receiving part is disposed on the base member and receives an outer casing through which the operation cable passes.

16 Claims, 17 Drawing Sheets

(56) References Cited

U.S. PATENT DOCUMENTS

| | | | | |
|---|---|---|---|---|
| 6,099,425 A * | 8/2000 | Kondo | ................ | B62M 9/1342 474/127 |
| 6,341,538 B1 * | 1/2002 | Takachi | ................ | B62M 9/137 188/24.19 |
| 6,471,610 B1 * | 10/2002 | Tseng | ................ | B62M 9/1342 474/80 |
| 6,491,597 B2 * | 12/2002 | Chen | ................ | B62M 9/1342 474/80 |
| 7,014,584 B2 * | 3/2006 | Nanko | ................ | B62M 9/1342 474/80 |
| 7,081,058 B2 * | 7/2006 | Nankou | ............... | B62M 9/1348 474/80 |
| 7,186,194 B2 * | 3/2007 | Nankou | ............... | B62M 9/1348 474/80 |
| 7,189,173 B2 * | 3/2007 | Tsai | ................ | B62M 9/1342 474/82 |
| 7,438,657 B2 * | 10/2008 | Nakai | ................ | B62M 9/1342 474/80 |
| 7,438,658 B2 * | 10/2008 | Tetsuka | ................ | B62M 9/1342 474/122 |
| 7,914,407 B2 * | 3/2011 | Fukushima | .......... | B62M 9/1342 474/80 |
| 8,337,343 B2 * | 12/2012 | Lin | ........................... | F16H 7/22 474/78 |
| 8,932,162 B2 * | 1/2015 | Emura | ................... | B62M 9/131 474/80 |
| 2002/0165054 A1 * | 11/2002 | Chen | ................... | B62M 9/1342 474/82 |
| 2003/0083161 A1 * | 5/2003 | Ozaki | ................. | B62M 9/1342 474/80 |
| 2003/0100393 A1 * | 5/2003 | Nanko | ................ | B62M 9/1342 474/80 |
| 2004/0005951 A1 * | 1/2004 | Tsai | .................... | B62M 9/1342 474/80 |
| 2006/0189421 A1 * | 8/2006 | Ichida | ................... | B62M 9/132 474/80 |
| 2008/0300076 A1 * | 12/2008 | Fukushima | .......... | B62M 9/1342 474/80 |

* cited by examiner

BICYCLE FRONT DERAILLEUR

BACKGROUND

1. Field of the Invention

This invention generally relates to a bicycle front derailleur. More specifically, the present invention relates to a bicycle front derailleur having an outer casing receiving part disposed on a base member that mounts the bicycle front derailleur to a bicycle frame.

2. Background Information

Generally, a front derailleur is mounted to the bicycle frame adjacent to the front chain rings to shift a chain laterally between the front chain rings. A front derailleur includes a fixed or base member that is non-movably secured to the bicycle frame, and a movable member. The movable member includes a chain guide that is movably supported relative to the base member to move between at least two lateral positions. Typically, a linkage assembly is coupled between the base member and the movable member to movably support the chain guide. The chain guide typically has a pair of cage plates or guide plates arranged to selectively contact and move the chain between the front chain rings. The chain guide is usually moved relative to the base member by pulling and/or releasing a shifter control operation cable that is coupled between a shifter and the front derailleur. The control operation cable is often connected to one of the pivotal links to apply a torque thereto in order to move the chain guide between an extended position and a retracted position. Two examples of operation cable operated front derailleurs are disclosed in U.S. Pat. No. 6,093,122 and U.S. Pat. No. 7,081,058.

SUMMARY

One aspect is to provide a bicycle front derailleur having an outer casing receiving part to receive an operation cable. The outer casing receiving part is configured to be disposed on a base member.

In view of the state of the known technology and in accordance with a first aspect of the present disclosure, a bicycle front derailleur is basically provided with a base member, a linkage assembly, a chain guide, an input link, a connecting link and an outer casing receiving part. The base member is configured to be mounted to a bicycle frame. The linkage assembly includes a first link pivotally coupled to the base member at a first pivot axis, an extension link operatively coupled to the first link and pivotally coupled to the base member, and a second link pivotally coupled to the base member at a second pivot axis. The chain guide is pivotally coupled to the first and second links to move between a retracted position and an extended position. The input link is pivotally supported relative to the base member about a third pivot axis. The input link is configured to be connected to an operation cable to move the input link in response to operation of the operation cable. The connecting link is pivotally connected to the input link about a fourth pivot axis and is pivotally connected to the extension link about a fifth pivot axis. The linkage assembly moves in response to movement of the input link. The outer casing receiving part is configured to receive an outer casing through which the operation cable passes. The outer casing receiving part is disposed on the base member.

In accordance with a second aspect of the present invention, the bicycle front derailleur according to the first aspect is configured so that the outer casing receiving part is disposed between the first pivot axis and the third pivot axis with respect to a vertical direction as viewed from an axial direction parallel to the first pivot axis.

In accordance with a third aspect of the present invention, the bicycle front derailleur according to the first aspect is configured so that the base member includes an outer portion and an inner portion. The inner portion is disposed closer to the bicycle frame than the outer portion in a state where the base member is mounted to the bicycle frame. The outer casing receiving part is disposed on the inner portion of the base member.

In accordance with a fourth aspect of the present invention, the bicycle front derailleur according to the third aspect is configured so that the outer casing receiving part at least partially protrudes from the inner portion toward the bicycle frame in the state where the base member is mounted to the bicycle frame.

In accordance with a fifth aspect of the present invention, the bicycle front derailleur according to the first aspect is configured so that the input link includes a cable attachment part configured to be attached to the operation cable. The cable attachment part is disposed opposite to the outer casing receiving part with respect to the third pivot axis in a vertical direction.

In accordance with a sixth aspect of the present invention, the bicycle front derailleur according to the first aspect is configured so that the extension link and the connecting link are configured such that the fourth pivot axis and the fifth pivot axis are spaced apart by a first distance that is longer than a second distance extending between the fifth pivot axis and the first pivot axis.

In accordance with a seventh aspect of the present invention, the bicycle front derailleur according to the first aspect further comprising at least one bearing member disposed between the third pivot axis and the input link.

In accordance with an eighth aspect of the present invention, the bicycle front derailleur according to the first aspect is configured so that the input link includes a cable adjuster configured to adjust a tension of the operation cable.

In accordance with a ninth aspect of the present invention, the bicycle front derailleur according to the first aspect is configured so that the extension link and the connecting link are disposed closer to downstream side of a chain running direction than the second link in a state where the base member is mounted to the bicycle frame.

In accordance with a tenth aspect of the present invention, the bicycle front derailleur according to the first aspect is configured so that the input link and the linkage assembly are arranged such that the input link pivots with respect to the base member through a rotational angle of sixty degrees or more about the third pivot axis to move the chain guide from the retracted position to the extended position.

In accordance with an eleventh aspect of the present invention, the bicycle front derailleur according to the first aspect is configured so that the input link and the extension link are pivotally arranged with respect to the base member such that the input link and the connecting link form an angle defined by the third pivot axis, the fourth pivot axis and the fifth pivot axis. The fourth pivot axis is a vertex point of the angle such that the angle is sixty degrees or more when the chain guide is at the retracted position.

In accordance with a twelfth aspect of the present invention, the bicycle front derailleur according to the first aspect is configured so that the input link and the extension link are pivotally arranged with respect to the base member such that the input link and the connecting link form an angle defined by the third pivot axis, the fourth pivot axis and the fifth pivot axis. The fourth pivot axis is a vertex point of the angle such that the angle is less than thirty degrees when the chain guide is at the extended position.

In accordance with a thirteenth aspect of the present invention, the bicycle front derailleur according to the first aspect is configured so that the input link and the extension link are pivotally arranged with respect to the base member such that the input link and the connecting link for an angle defined by the third pivot axis, the fourth pivot axis and the fifth pivot axis. The fourth pivot axis is a vertex point of the angle such that the angle changes more than thirty degrees between the retracted position and the extended position.

In accordance with a fourteenth aspect of the present invention, the bicycle front derailleur according to the thirteenth aspect is configured so that the angle changes more than forty degrees between the retracted position and the extended position.

In accordance with a fifteenth aspect of the present invention, the bicycle front derailleur according to the first aspect is configured so that the outer casing receiving part includes an inlet opening into which the outer casing is inserted. The inlet opening is facing downward with respect to a vertical direction in a state where the base member is mounted to the bicycle frame.

In accordance with a sixteenth aspect of the present invention, the bicycle front derailleur is comprises a base member, a linkage assembly, a chain guide and an outer casing receiving part. The base member is configured to be mounted to a bicycle frame. The linkage assembly includes a first link pivotally coupled to the base member and a second link pivotally coupled to the base member. The chain guide is pivotally coupled to the first and second links to move between a retracted position and an extended position. The outer casing receiving part is configured to receive an outer casing through which an operation cable passes. The outer casing receiving part includes an inlet opening into which the outer casing is inserted. The inlet opening is facing downward with respect to a vertical direction in a state where the base member is mounted to the bicycle frame.

Also other objects, features, aspects and advantages of the disclosed bicycle front derailleur will become apparent to those skilled in the art from the following detailed description, which, taken in conjunction with the annexed drawings, discloses two illustrative embodiments of the bicycle front derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
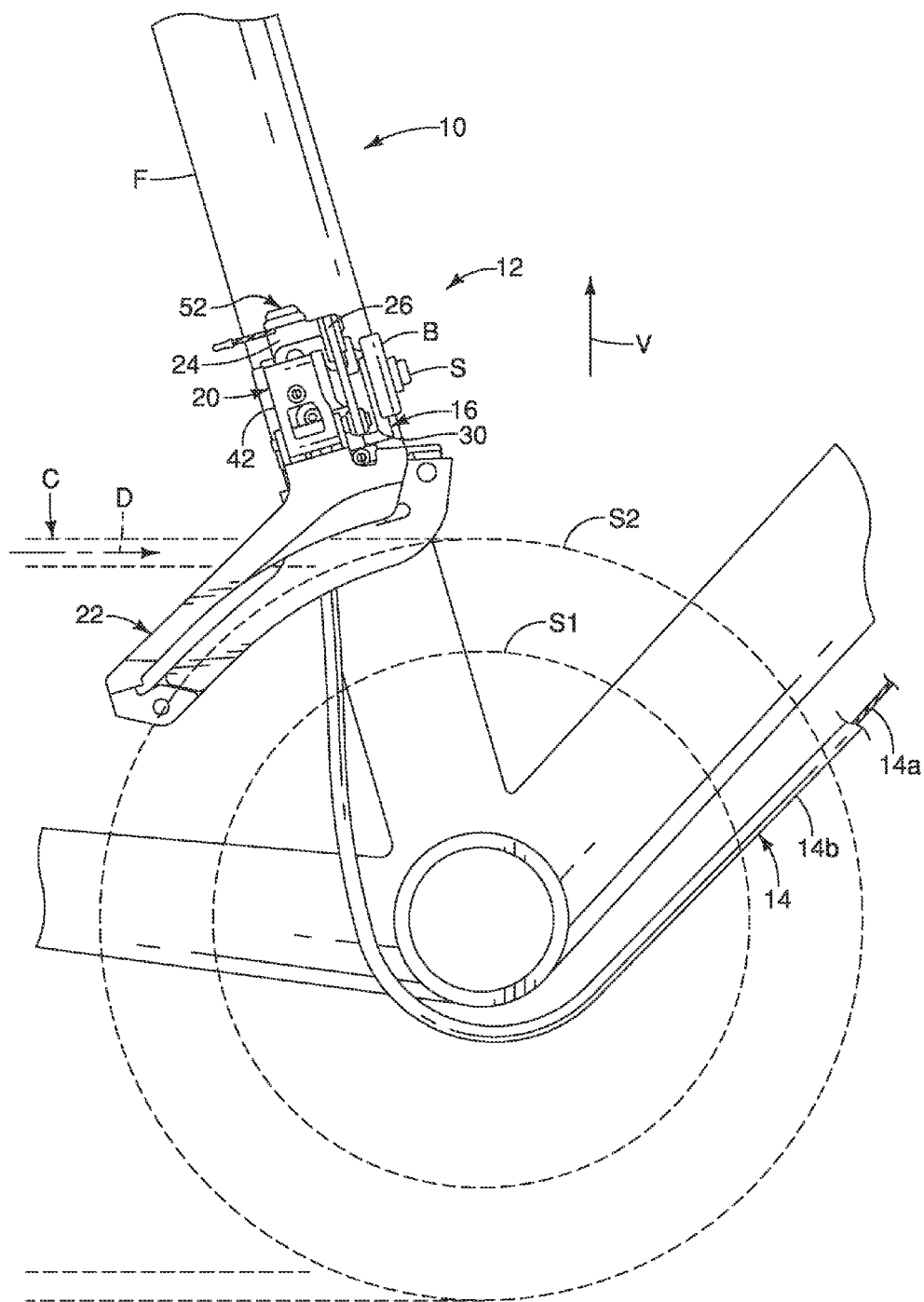
FIG. 1 is a partial side elevational view of a bicycle frame with a bicycle front derailleur mounted thereto in accordance with one illustrated embodiment.
Figure 2:
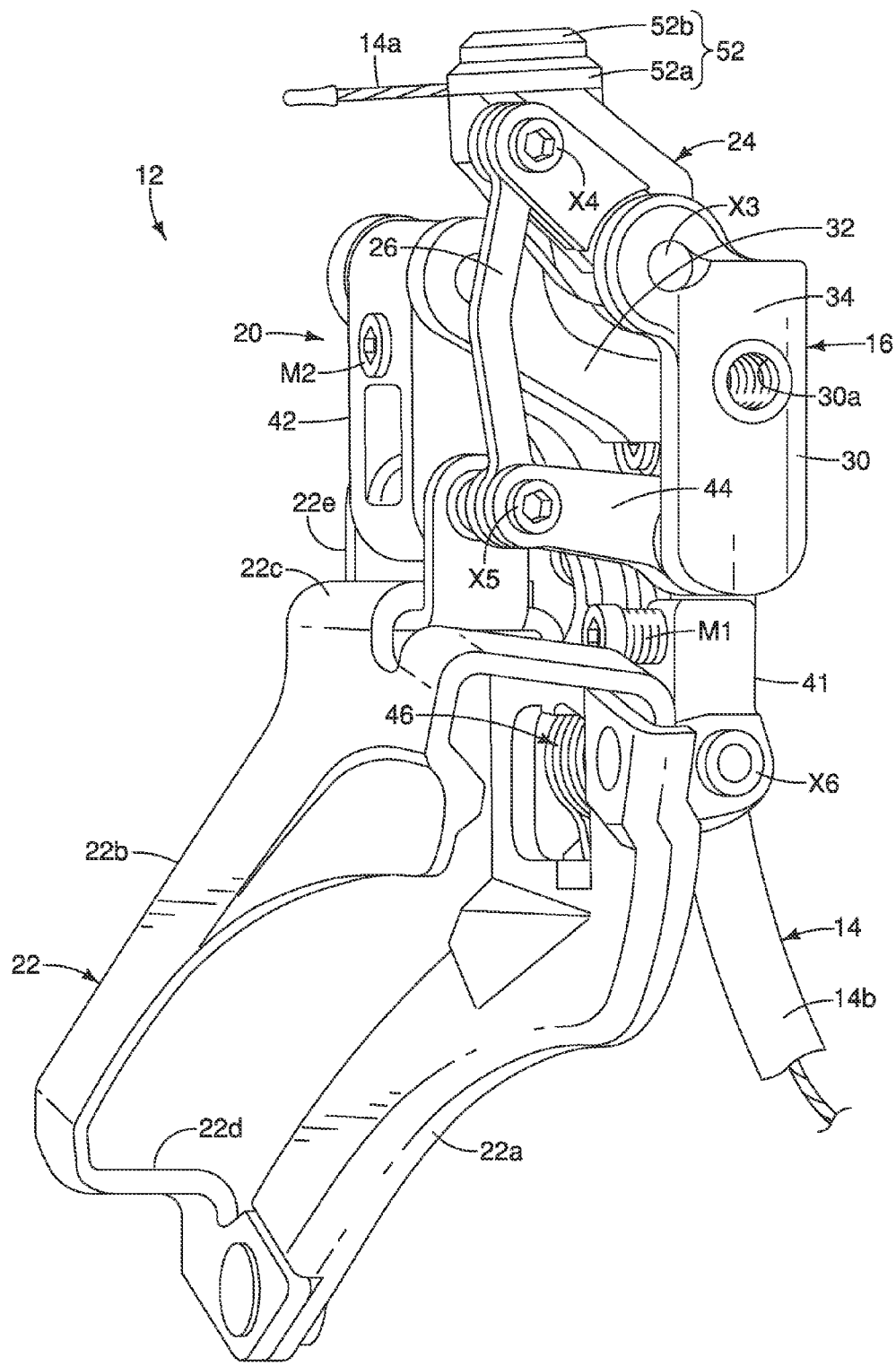
FIG. 2 is an outer side perspective view of the front derailleur illustrated in FIG. 1.

Referring initially to FIG. 1, a portion of a bicycle 10 is illustrated that is equipped with a bicycle front derailleur 12 in accordance with one embodiment. Here, the front derailleur 12 is mounted to a bicycle frame F of the bicycle 10. In particular, the front derailleur 12 is mounted to the seat tube of the bicycle frame F by a bracket B. The front derailleur 12 is a cable operated derailleur that is operated in response to the operation of a shifter (not shown) in a conventional manner. In particular, the bicycle front derailleur 12 is operated by an operation cable 14 that has a first end connected to the bicycle front derailleur 12 and a second end connected to the shifter. The operation cable 14 is a conventional bicycle operation cable that has an inner wire 14$a$ covered by an outer casing 14$b$. In other words, the operation cable 14 is a Bowden type operation cable in which the inner wire 14$a$ is slidably received within the outer casing 14$b$. The shifter operates the front derailleur 12 by selectively pulling and releasing the inner wire 14$a$ in response to operation of a shifter. The front derailleur 12 is a bottom-pull type of front derailleur such that the inner wire 14a of the operation cable 114 is pulled downwardly as will be discussed in greater detail later.

Referring to FIGS. 2 to 7, the bicycle front derailleur 12 basically comprises a base member 16, an outer casing receiving part 18, a linkage assembly 20, a chain guide 22, an input link 24 and a connecting link 26. Basically, the base member 16 is fixedly mounted to the bicycle frame F in a conventional manner. The chain guide 22 is movably supported to the base member 16 by the linkage assembly 20 for moving the chain guide 22 relative to the base member 16. The inner wire 14a is attached to the input link 24, which is pivotally mounted on the base member 16. The connecting link 26 interconnects the input link 24 to the linkage assembly 20. In this way, operation of the operation cable 14 causes the chain guide 22 to move with respect to the base member 16.

Figure 8:
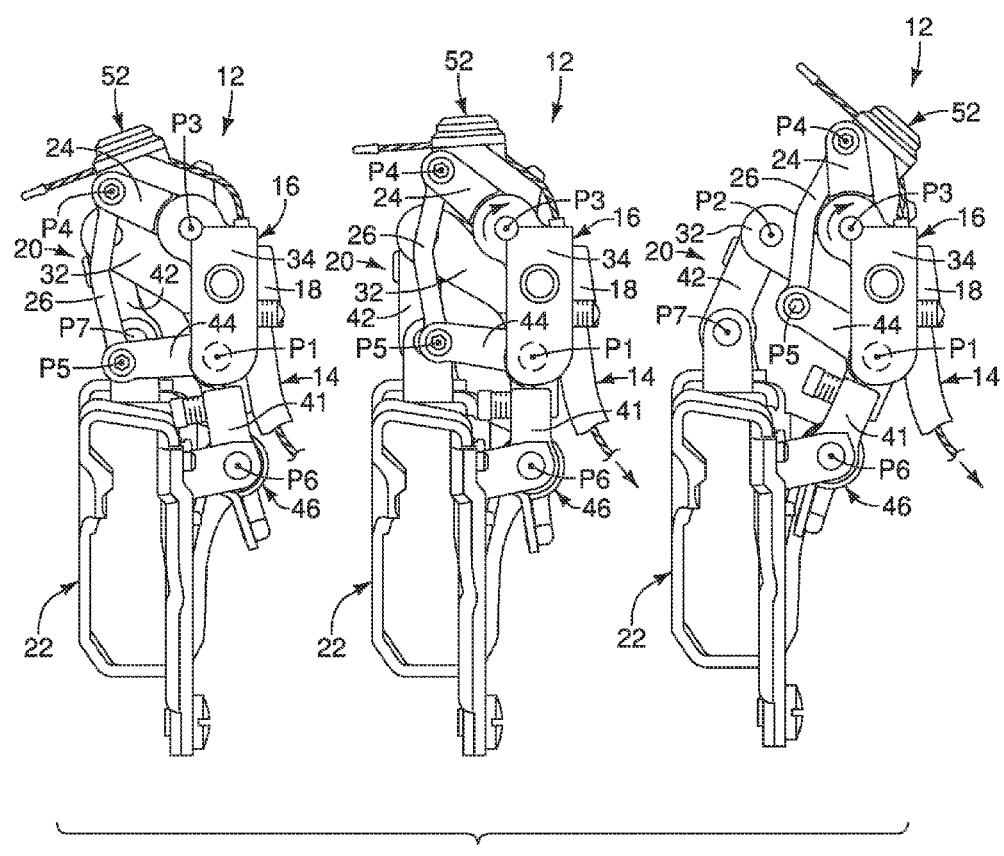
FIG. 8 is a series of front elevational views of the front derailleur illustrated in FIGS. 1 to 7 in which the chain guide is shifted from the retracted position (far left) to the extended position (far right)
Figure 9:
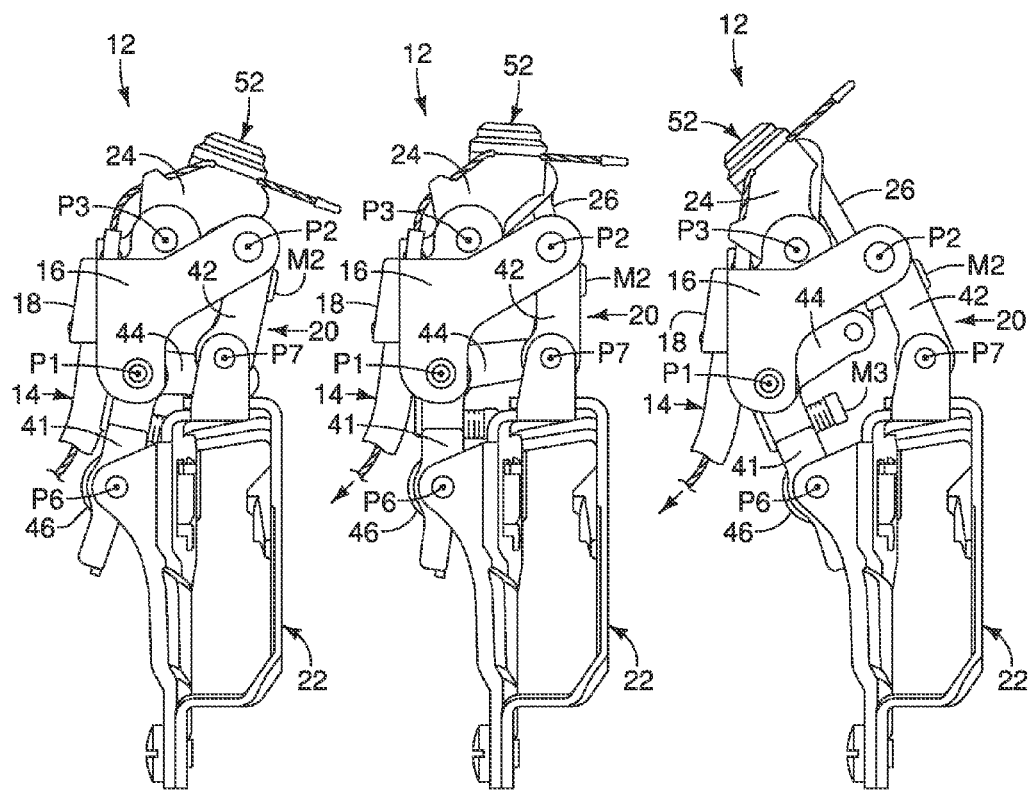
FIG. 9 is a series of rear elevational views of the front derailleur illustrated in FIGS. 1 to 8 in which the chain guide is shifted from the retracted position (far left) to the extended position (far right)

Referring back to FIG. 1, the chain guide 22 moves a chain C in a transverse direction with respect to a center longitudinal plane of the bicycle frame F. Here, the bicycle frame F is provided with a pair of chain rings S1 and S2. Of course, the bicycle frame F can be provided with more than two chain rings as needed and/or desired. The chain guide 22 is designed to shift the chain C between the chain rings S1 and S2 as the chain guide 22 moves between a retracted position and an extended position depending on whether the operation cable 14 is pulled or released, as seen in FIGS. 8 and 9. In the first illustrated embodiment, when the chain guide 22 is in the retracted position, the front derailleur 12 shifts from the retracted position to the extended position in response to the operation cable 14 being pulled. On the other hand, in the first illustrated embodiment, when the chain guide 22 is in the extended position, the front derailleur 12 shifts from the extended position to the retracted position in response to the operation cable 14 being released.

The base member 16 is configured to be mounted to the bicycle frame F. As best seen in FIG. 1, the base member 16 includes a bicycle mounting portion 30. The bicycle mounting portion 30 is configured to be coupled to the bracket B on a seat tube of the bicycle frame F by a mounting screw S. The screw S is threaded into a threaded hole 30a of the bicycle mounting portion 30 as shown in FIG. 1. While the bicycle mounting portion 30 is illustrated as a "braze-on type" of mounting structure, the bicycle mounting portion 30 is not limited to this type of mounting structure. For example, the bicycle mounting portion 30 of the bicycle front derailleur 112 can be replaced with a base member have a "clamp band type" of a bicycle mounting portion, if needed and/or desired.

As best seen in FIGS. 2, 3, 6 and 7, the base member 16 includes an outer portion 32 and an inner portion 34. The division between the outer and inner portions 32 and 34 is defined by a center plane CP (see FIGS. 6 and 7) that is parallel to a vertically longitudinal center plane of the bicycle frame F. The center plane CP passes through a center portion of the base member 16 with respect to the transverse direction. The center plane CP divides the base member 16 into two halves that correspond to the outer and inner portions 32 and 34. The inner portion 34 is disposed closer to the bicycle frame F than the outer portion 32 in a state where the base member 16 is mounted to the bicycle frame F. The base member 16 is pivotally connected to the linkage assembly 20 at a first pivot axis P1 and a second pivot axis P2. Thus, the base member 16 includes a pair of first mounting holes 16a for receiving a first pivot axle X1 and a pair of second mounting holes 16b for receiving a second pivot axle X2. The linkage assembly 20 is swingably mounted to the base member 16 by the first and second pivot axles X1 and X2. The base member 16 is also pivotally connected to the input link 24 at a third pivot axis P3. Thus, the base member 16 includes a pair of third mounting holes 16c for receiving a third pivot axle X3. In this way, the input link 24 is pivotally attached to the base member 16 to pivot on the third pivot axle X3 about the third pivot axis P3.

Figure 3:
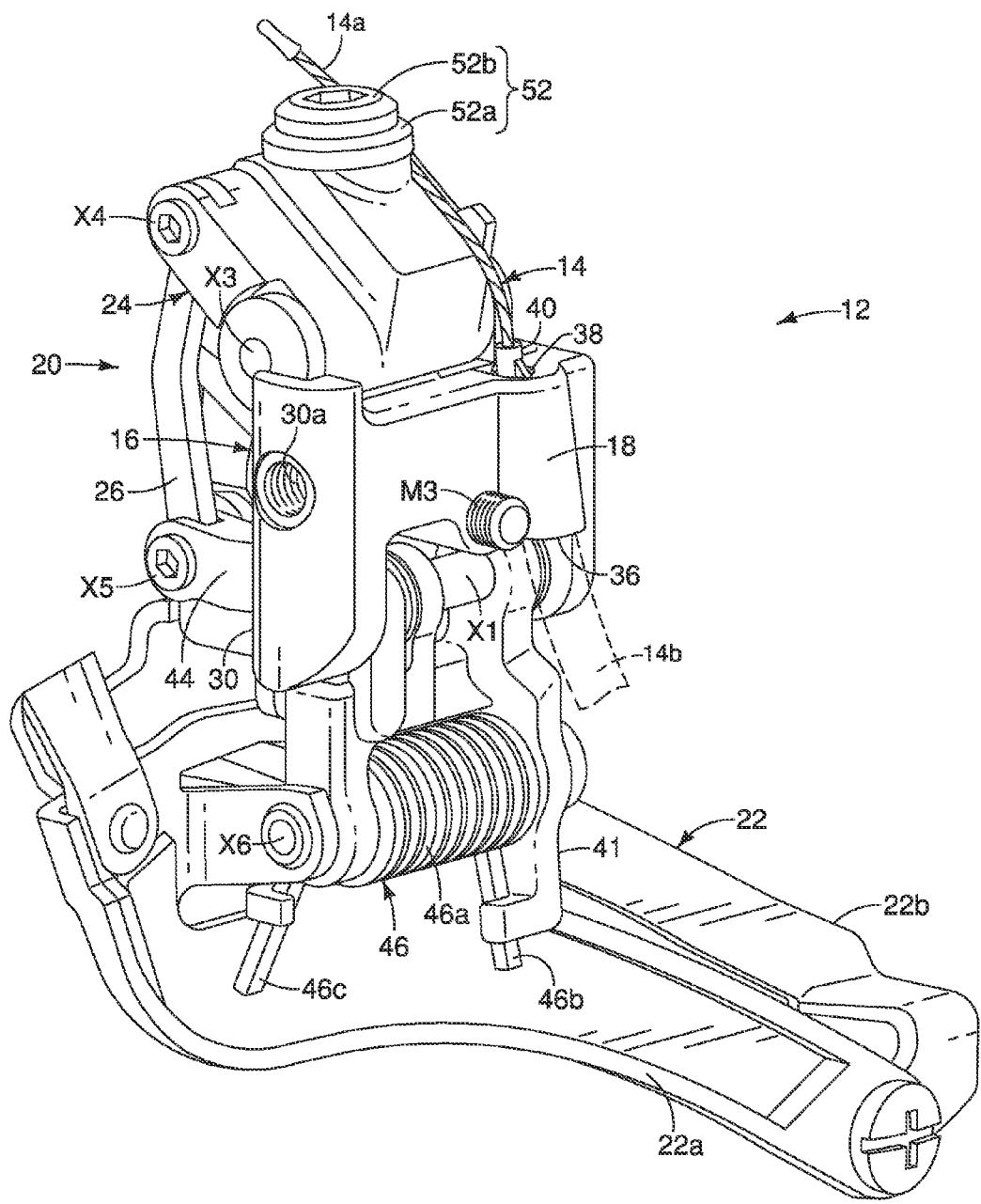
FIG. 3 is an inner side perspective view of the front derailleur illustrated in FIGS. 1 and 2.
Figure 5:
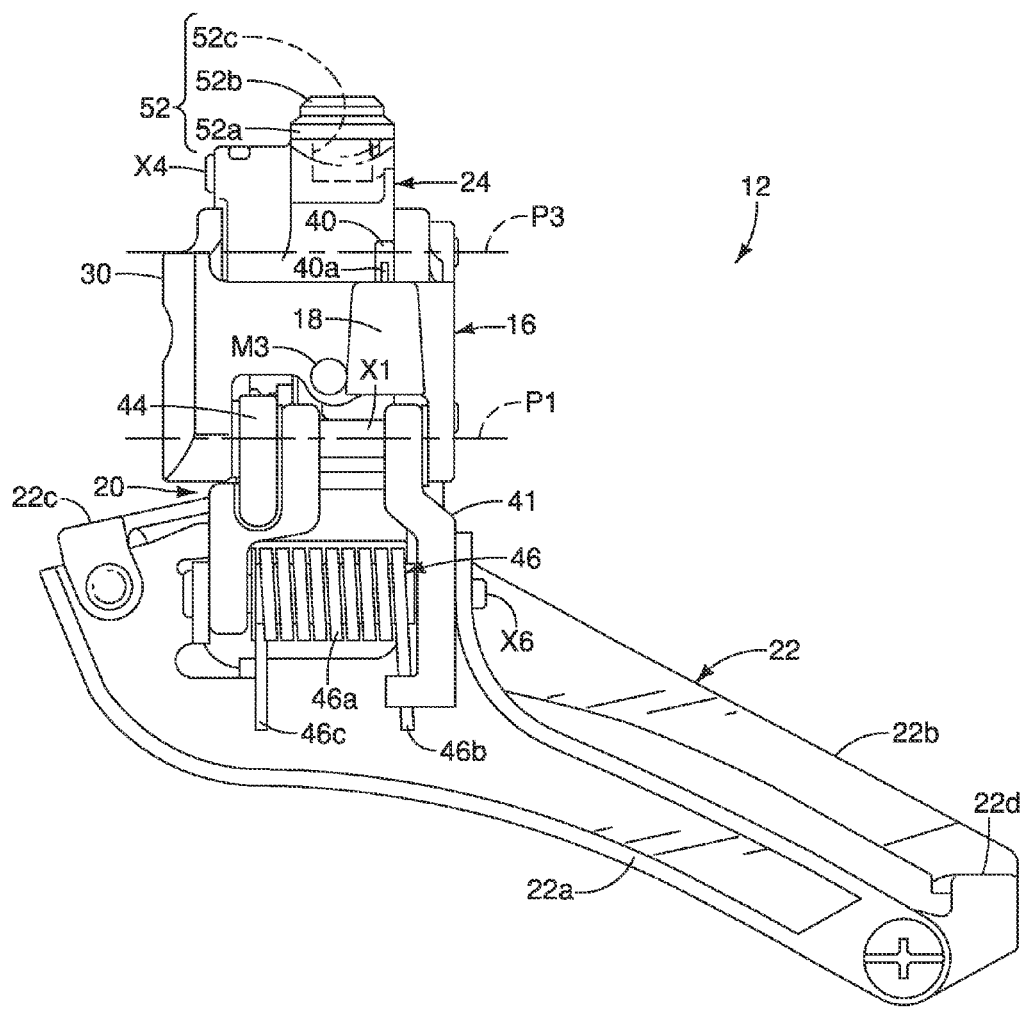
FIG. 5 is an inner side elevational view of the front derailleur illustrated in FIGS. 1 to 4.
Figure 6:
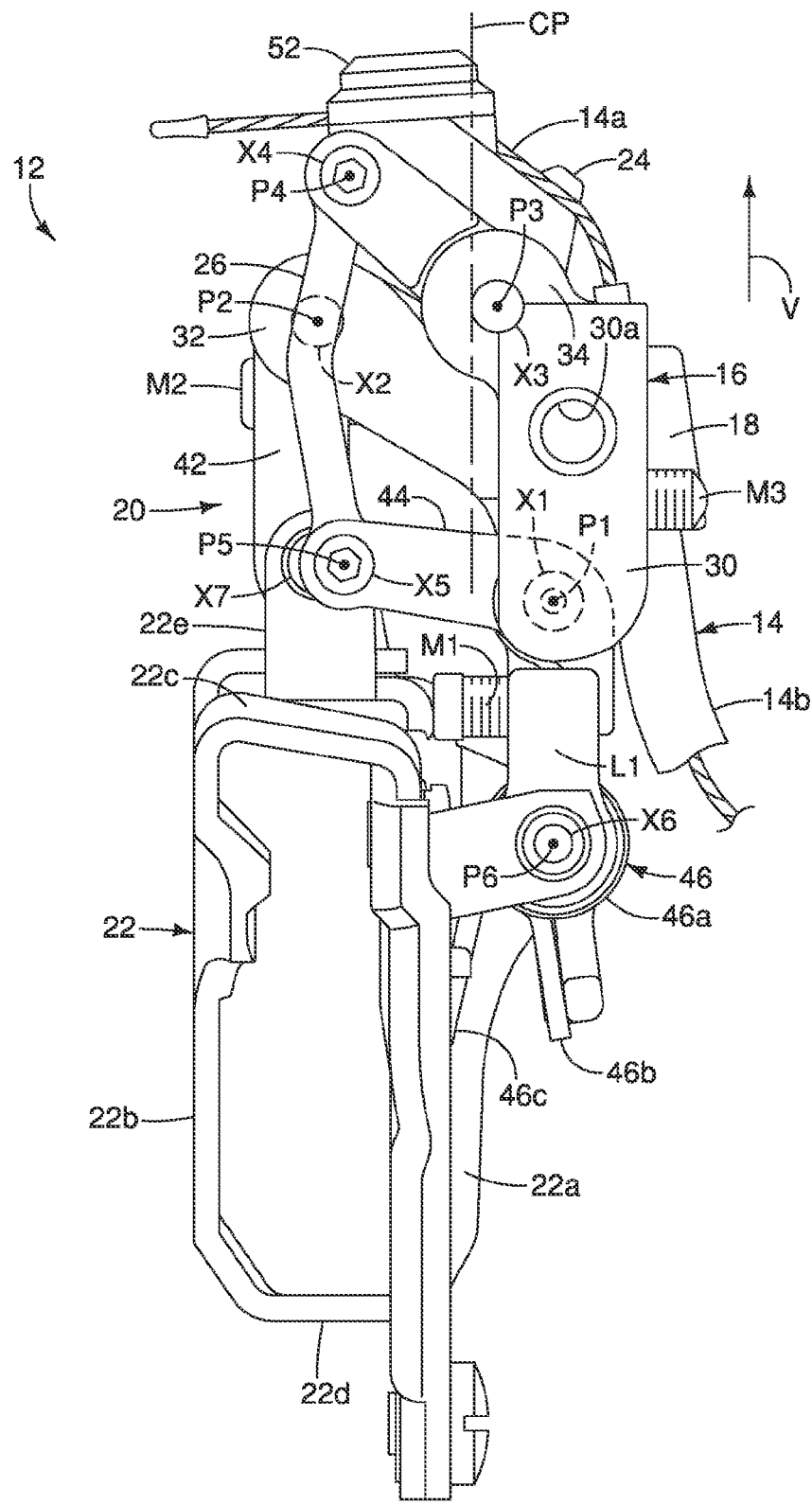
FIG. 6 is a front elevational view of the front derailleur illustrated in FIGS. 1 to 5.

The outer casing receiving part 18 is disposed on the base member 16. Specifically, the outer casing receiving part 18 is disposed on the inner portion 34 of the base member 16, as best seen in FIGS. 3 and 5. However, it will be apparent from this disclosure that the outer casing receiving part 18 could be disposed on the outer portion 32. Here in the illustrated embodiment, the outer casing receiving part 18 and the base member 16 are formed as a one-piece member. However, it will be apparent from this disclosure that the outer casing receiving part 18 could be a separate member from the base member 16 and attached to the base member 16. Here in the illustrated embodiment, the outer casing receiving part 18 at least partially protrudes from the inner portion 34 toward the bicycle frame F in the state where the base member 16 is mounted to the bicycle frame F. As seen in FIG. 6, the outer casing receiving part 18 is disposed between the first pivot axis P1 and the third pivot axis P3 with respect to a vertical direction V as viewed from an axial direction parallel to the first pivot axis P1.

Figure 12:
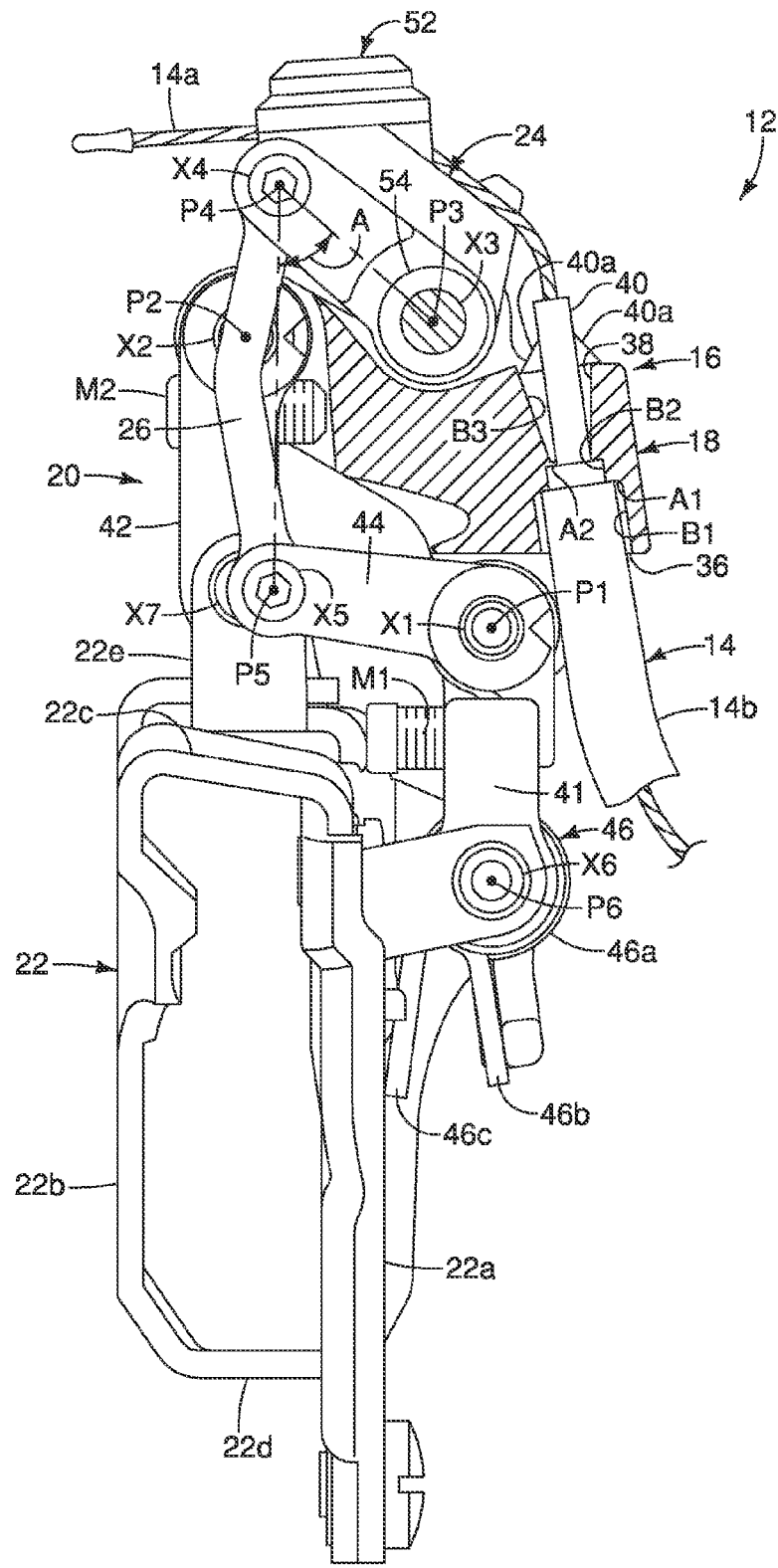
FIG. 12 is a front elevational view of the front derailleur illustrated in FIGS. 1 to 11 with selected portions broken way to show details of the outer casing receiving part.
Figure 13:
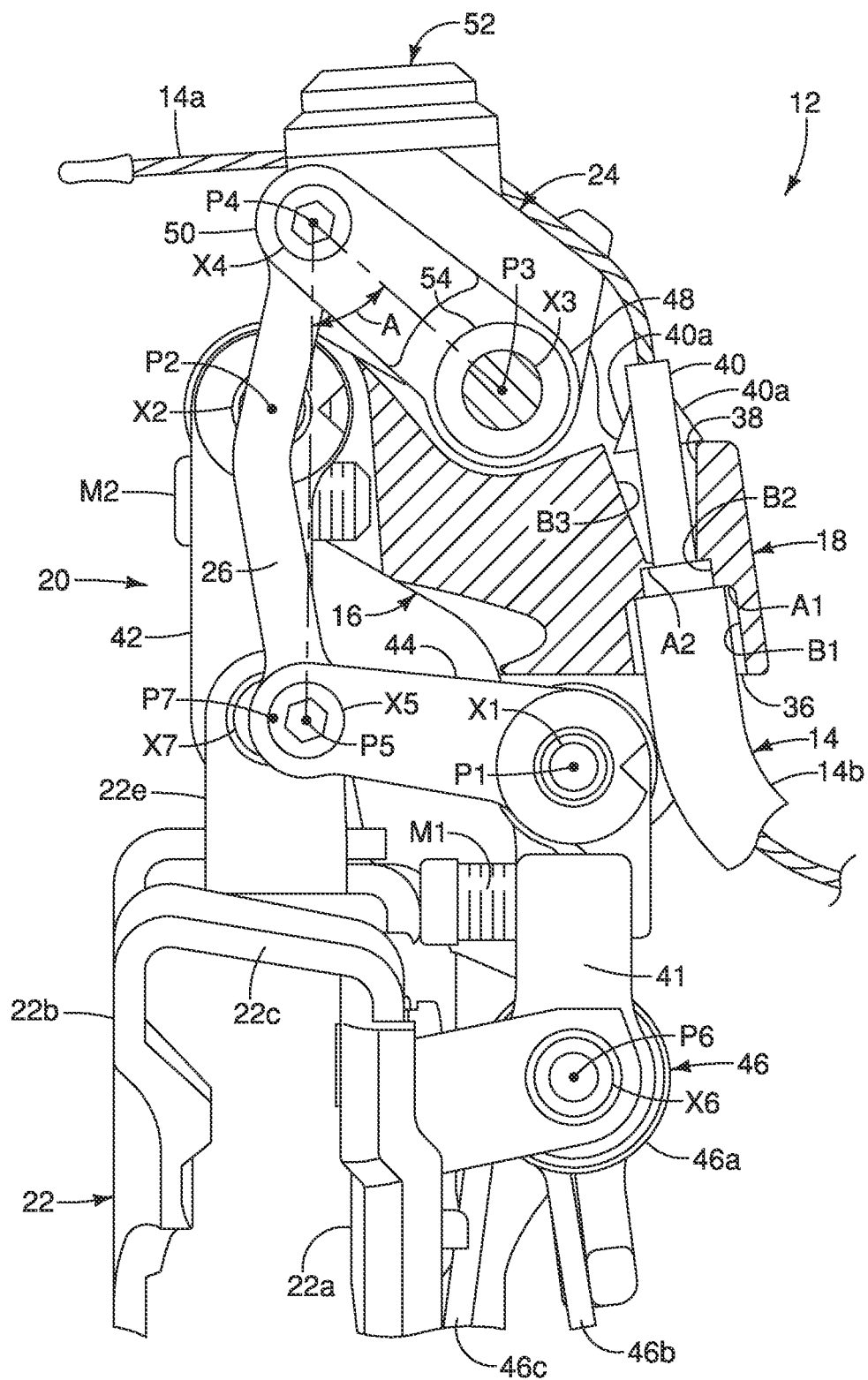
FIG. 13 is an enlarged front elevational view of a portion of the front derailleur illustrated in FIGS. 1 to 12 with selected portions broken way to show details of the outer casing receiving part.

Referring now to FIGS. 12 to 15, the outer casing receiving part 18 is configured to receive the outer casing 14b through which the inner wire 14a passes. In particular, the outer casing receiving part 18 includes an inlet opening 36 into which the outer casing 14b is inserted. As best seen in FIGS. 12 and 13, the inlet opening 36 is facing downward with respect to a vertical direction in a state where the base member 16 is mounted to the bicycle frame F. The outer casing receiving part 18 further includes an outlet opening 38 which the inner wire 14a is brought out of in an upward direction. The outlet opening 38 is disposed on the opposite end of the outer casing receiving part 18 from the inlet opening 36. In this way, the outlet opening 38 is facing upward with respect to a vertical direction in a state where the base member 16 is mounted to the bicycle frame F. As previously mentioned, in the illustrated embodiment, the front derailleur 12 is a bottom-pull derailleur. The operation cable 14 is routed into the inlet opening 36 and passes upwardly through the outlet opening 38.

Still referring now to FIGS. 12 to 15, the outer casing receiving part 18 further includes a first cylindrical bore section B1, a second cylindrical bore section B2 and a frustoconically shaped bore section B3. The inlet opening 36 leads directly into the first cylindrical bore section B1. At the same time, the frustoconically shaped bore section B3 leads directly to the outlet opening 38. Therefore, the inlet opening 36 is defined by the first cylindrical bore section B1 and the outlet opening 38 is defined by the frustoconically shaped bore section B3. The second cylindrical bore section B2 is disposed between the first cylindrical bore section B1 and the frustoconically shaped bore section B3.

The first cylindrical bore section B1 has a larger diameter than the second cylindrical bore section B2. Thus, a first abutment A1 is formed between the first cylindrical bore section B1 and the second cylindrical bore section B2. In turn, the separation between the second cylindrical bore section B2 and the frustoconically shaped bore section B3 is marked by a second abutment A2. Preferably, the frustoconically shaped bore section B3 has a small diameter end formed adjacent the second cylindrical bore section B2, and a large diameter end forming the outlet opening 38. Thus, a second abutment A2 is formed between the second cylindrical bore section B2 and the frustoconically shaped bore section B3.

Figure 14:
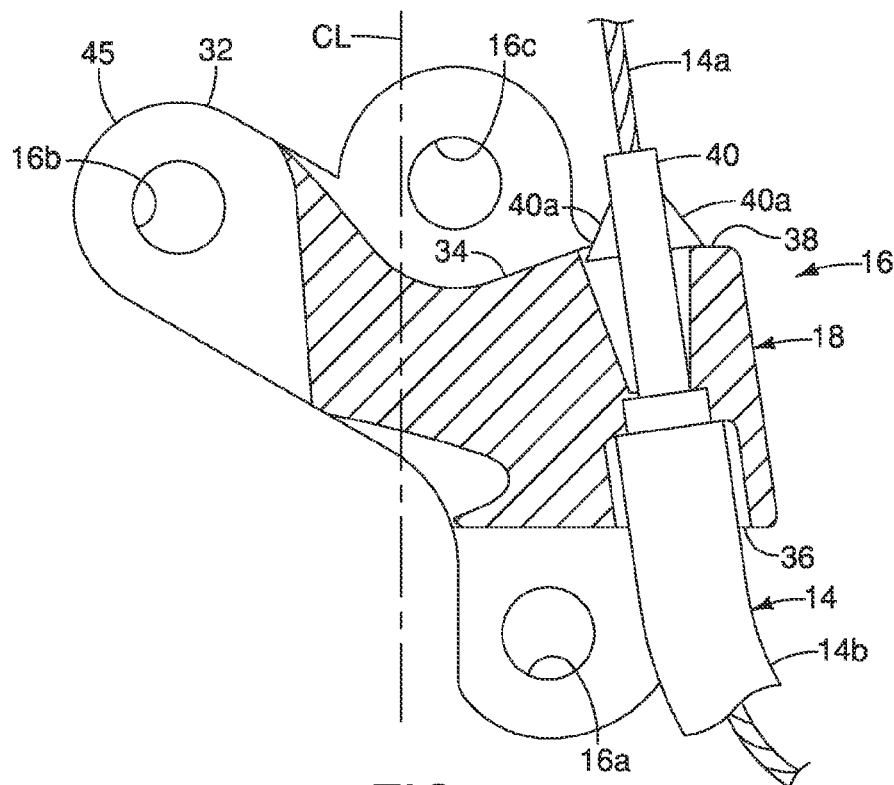
FIG. 14 is a cross sectional view of the base member of the front derailleur illustrated in FIGS. 1 to 13 with an operation cable inserted into the outer casing receiving part.

Referring to FIG. 14, the inlet opening 36 receives the outer casing 14b of the operation cable 14 such that an end portion of the outer casing 14b is disposed with the first cylindrical bore section B1. The end portion of the outer casing 14b directly contacting the first abutment A1. The inner wire 14a of the operation cable 14 pass through the first and second cylindrical bore sections B1 and B2 and the frustoconically shaped bore section B3. In particular, the inner wire 14a passes out of the outer casing 14b and passes out of the outlet opening 38.

Preferably, an inner wire guide 40 is inserted through the inlet opening 36 and is disposed within the second cylindrical bore section B2 and the frustoconically shaped bore section B3. The inner wire guide 40 is preferably constructed of a material with a low friction coefficient, such as nylon or other suitable plastic material. The inner wire guide 40 operates to protect the inner wire 14a and facilitate smooth passage of the inner wire 14a through the outer casing receiving part 18. The inner wire guide 40 is preferably configured to extend out of the frustoconically shaped bore section B3 through the outlet opening 38.

The inner wire guide 40 includes a pair of detents 40a. Preferably, the detents 40a are fin shaped projections. The detents 40a are configured to resiliently deform during insertion into the frustoconically shaped bore section B3 of the outer casing receiving part 18. The detents 40a are configured to return to their original undeformed state after the inner wire guide 40 reaches its resting or installed position within the outer casing receiving part 18. Upon the detents 40a returning to their original undeformed state, the detents 40a have a diameter larger than the diameter of the outlet opening 38. In this way, the inner wire guide 40 is snap-fitted into the outer casing receiving part 18.

Referring back to FIGS. 2 to 7, the linkage assembly 20 will now be discussed in further detail. The linkage assembly 20 pivotally connects the chain guide 22 to the base member 16. The linkage assembly 20 includes a first link 41, a second link 42 and an extension link 44. The linkage assembly 20 is pivotally coupled to the base member 16 at the first and second pivot axes P1 and P2. Specifically, the first link 41 is pivotally coupled to the base member 16 at the first pivot axis P1. On the other hand, the second link 42 is pivotally coupled to the base member 16 at the second pivot axis P2. As best seen in FIGS. 3 and 5, a first end of the extension link 44 is operatively coupled to the first link 41 and pivotally coupled to the base member 16 about the first pivot axis P1. A second end of the extension link 44 is pivotally coupled to connecting link 26. The connecting link 26 has a first end portion pivotally coupled to the input link 24 at a fourth pivot axis P4, and a second end portion pivotally coupled to the extension link 44 at a fifth pivot axis P5. The chain guide 22 is pivotally supported by the first link 41 at a sixth pivot axis P6, and is pivotally supported by the second link 42 at a seventh pivot axis P7.

In particular, the first pivot axle X1 pivotally mounts both the first link 41 and the extension link 44 to the base member 16. Thus, the first pivot axis P1 is defined by the first pivot axle X1. On the other hand, the second pivot axle X2 pivotally mounts the second link 42 to the outer portion 32 of the base member 16. Thus, the second pivot axis P2 is defined by the second pivot axle X2. The input link 24 is pivotally coupled to the base member 16 by the third pivot axle X3. The third pivot axis P3 is defined by the third pivot axle X3. The connecting link 26 is pivotally connected to the input link 24 by a fourth pivot axle X4. The connecting link 26 is also pivotally connected to the extension link 44 by a fifth pivot axle X5. The chain guide 22 is pivotally connected to the first link 41 by a sixth pivot axle X6, and is pivotally connected to the second link 42 by a seventh pivot axle X7. The sixth and seventh pivot axes P6 and P7 are defined by the sixth and seventh pivot axles X6 and X7, respectively.

Figure 4:
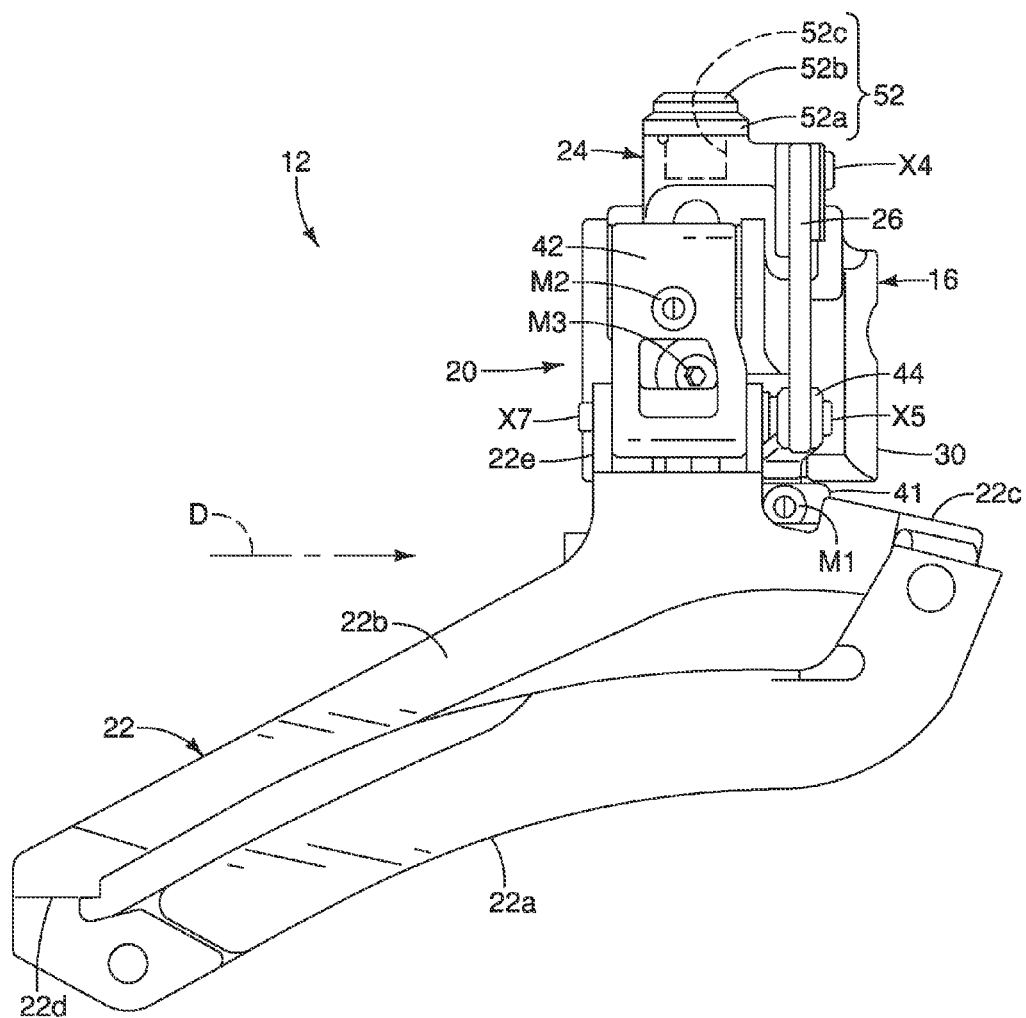
FIG. 4 is an outer side elevational view of the front derailleur illustrated in FIGS. 1 to 3.

As best seen in FIG. 6, the extension link 44 and the connecting link 26 are configured such that the fourth pivot axis P4 and the fifth pivot axis P5 are spaced apart by a first distance that is longer than a second distance extending between the fifth pivot axis P5 and first pivot axis P1. In other words, the connecting link 26 is preferably longer than the extension link 44. As best seen in FIG. 4, the extension link 44 and the connecting link 26 are disposed closer to downstream side of a chain running direction D than the second link 42 in a state where the base member 16 is mounted to the bicycle frame F. As used herein, the chain running direction refers to the moving direction of the chain C as the chain rings S1 and S2 are rotated in a driving direction (clockwise in FIG. 1) by the rider pedaling.

Figure 15:
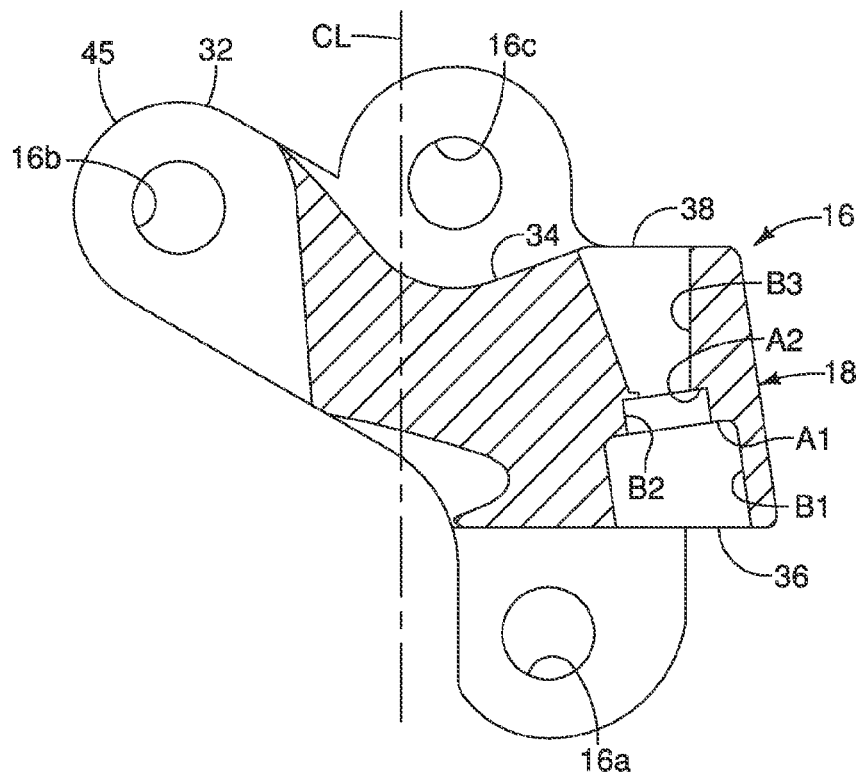
FIG. 15 is a cross sectional view, similar to FIG. 14, of the base member of the front derailleur illustrated in FIGS. 1 to 13, but with the operation cable removed.
Figure 16:
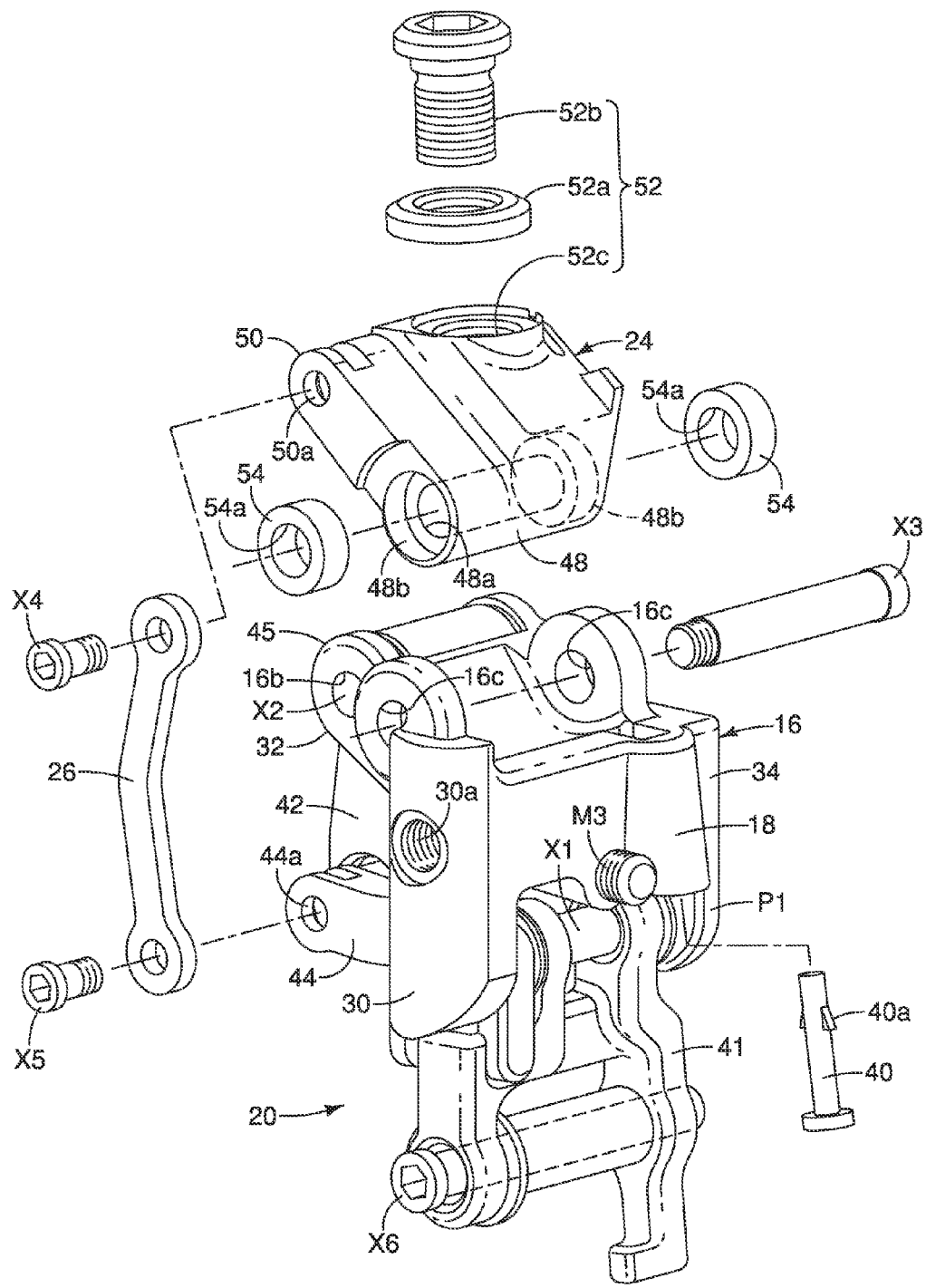
FIG. 16 is an exploded perspective view of selected parts of the front derailleur illustrated in FIGS. 1 to 13.

During operation of the operation cable 14, the extension link 44 pivots about the first pivot axis P1 and transfers the operating three to the first link 41 of the linkage assembly 20. At the same time, the second link 42 pivots about the second pivot axis P2. The outer portion 32 of the base member 16 includes a first upper connecting portion 45 as best seen in FIGS. 14 to 16. The first upper connecting portion 45 is a pair of projections that include the second mounting holes 16b that are co-axially aligned to receive the second pivot axle X2 thereto. The length of the second pivot axle X2 extends the width of the first upper connecting portion 45 of the base member 16. Thus, the second pivot axle X2 pivotally mounts the second link 42 to the base member 16 at the second pivot axis P2.

Figure 7:
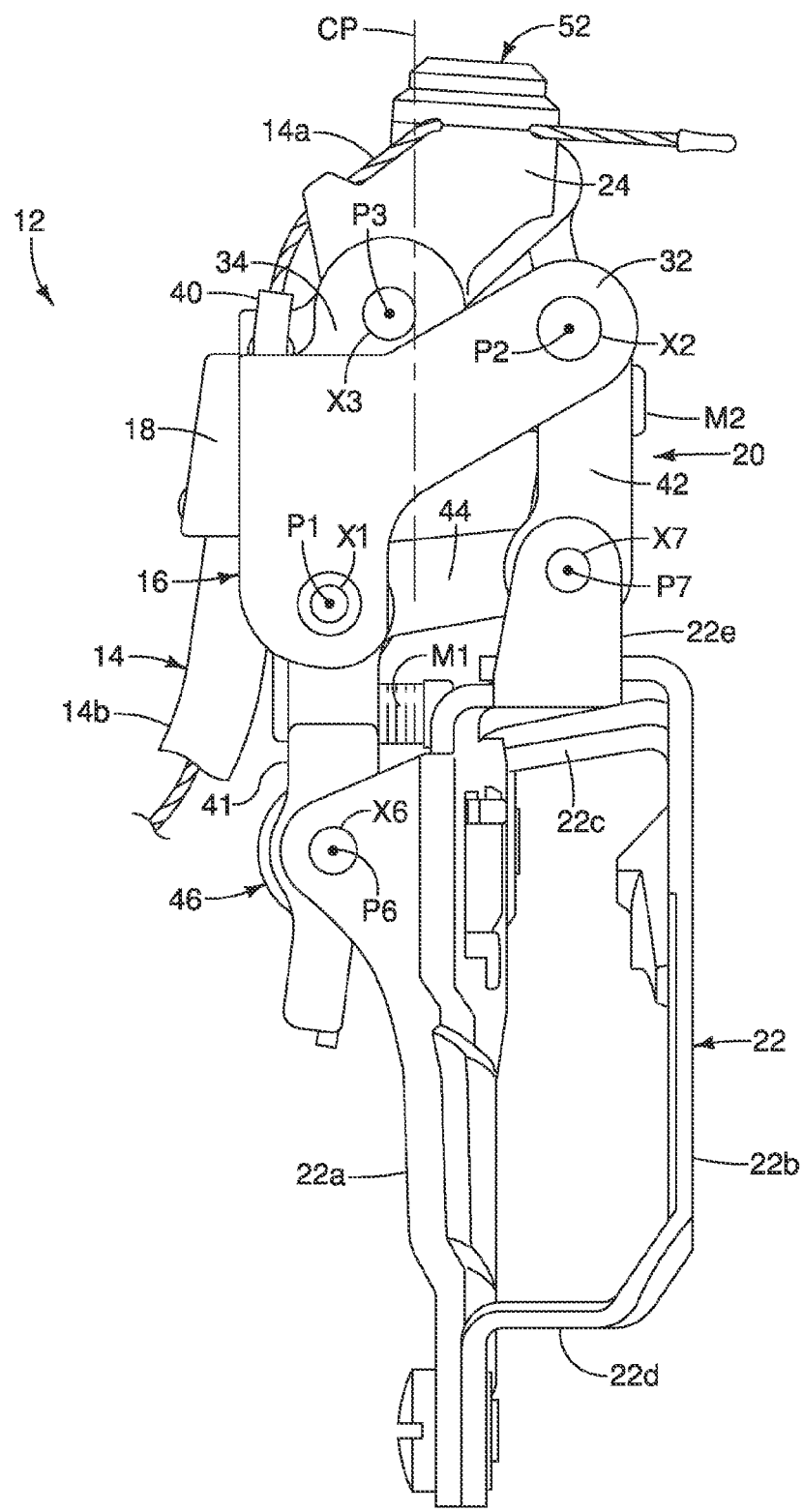
FIG. 7 is a rear elevational view of the front derailleur illustrated in FIGS. 1 to 6.

In the illustrated embodiment, as seen in FIGS. 6 and 7, the linkage assembly 20 preferably includes a first adjustment member M1, a second adjustment member M2 and a third adjustment member M3. Each of the first, second and third adjustment members M1, M2 and M3 is a screw. The first adjustment member M1 is threaded into a threaded hole in the first link 41, and has a free end that abuts against an end of the extension link 44. By screwing or unscrewing the first adjustment member M1, an angular position of the extension link 44 can be adjusted with respect to the first link 41 about the first pivot axis P1. Of course, it will be apparent from this disclosure that the first link 41 and the extension link 44 can be formed as a single member if needed and/or desired. The second adjustment member M2 is threaded into a threaded hole in the second link 42, and has a free end that abuts against the base member 16. By screwing or unscrewing the second adjustment member M2, an end point of the retracted position of the chain guide 22 can be adjusted. Thus, the second adjustment member M2 limits the movement of the chain guide 22 towards the bicycle frame F by abutting against the base member 16 to create the end point of the movement of the chain guide 22. The third adjustment member M3 is threaded into a threaded hole in the base member 16, and has a free end that abuts against the bracket B or the bicycle frame F. By screwing or unscrewing the third adjustment member M3, the angle of the chain guide 22 can be adjusted with respect to the longitudinal, vertical center plane. Because the adjustment members are known in the bicycle field, the first, second and third adjustment members M1, M2 and M3 will not be further discussed herein.

Referring back to FIG. 2, the chain guide 22 will now be discussed in greater detail. In the first illustrated embodiment, the chain guide 22 includes a first guide plate 22a and a second guide plate 22b. The first and second guide plates 22a and 22b form a chain receiving slot therebetween. As previously mentioned, the chain guide 22 is pivotally coupled to the base member 16 by the first and second links 41 and 42 of the linkage assembly 20. In particular, the chain guide 22 is pivotally coupled to the first and second links 41 and 42 to move between the retracted position (i.e., the drawing at left end in FIGS. 8 and 9) and the extended position (i.e., the drawing at right end in FIGS. 8 and 9). The first guide plate 22a is connected to the second guide plate 22b by a first or upper connecting portion 22c and a second or rear-end connecting portion 22d. In the illustrated embodiment, the first guide plate 22a, the second guide plate 22b, the first connecting portion 22c and the second connecting portion 22d are formed as a one-piece, unitary member by bending a single piece of a metal sheet. The chain guide 22 further includes a U-shaped attachment part 22e that is fixed (e.g., riveted) to the first connecting portion 22c. As best seen in FIGS. 6 and 7, the first guide plate 22a is pivotally connected to the first link 41 by the sixth pivot axle X6. The attachment part 22e is pivotally connected to the second link 42 by the seventh pivot axle X7.

In the first illustrated embodiment, as seen in FIG. 3, the chain guide 22 is biased in the retracted position relative to the base member 16 by a biasing member 46. The biasing member 46 has a coiled portion 46a that is disposed around the sixth pivot axle X6. The biasing member 46 has a first free end portion 46b that contacts the first link 41 and a second free end portion 46c that contacts the first guide plate 22a. Thus, the biasing member 46 is operatively disposed between the base member 16 and the chain guide 22. The biasing member 46 biases the chain guide 22 towards the retracted position so as to position the chain guide 22 over the small chain ring S1. Thus, in the first illustrated embodiment, the retracted position (i.e., the drawing at left end in FIGS. 8 and 9) constitutes an initial state or rest position of the chain guide 22. In particular, the biasing member 46 maintains the chain guide 22 at the retracted position when the operation cable 14 is released or detached from the bicycle front derailleur 12.

In the first illustrated embodiment, the biasing member 46 and the linkage assembly 20 are arranged with respect to the base member 16, the outer casing receiving part 18 and the chain guide 22 to form a down-swing derailleur. The down-swing derailleur refers to a derailleur that has its chain guide is mounted at the bottom pivot axes of the four-bar linkage that carries it. The outer casing receiving part 18 is arranged with respect to the base member 16 to form a bottom-pull derailleur. The bottom-pull derailleur refers to a derailleur that has the operation cable 14 being pulled in a downward direction to move the chain guide 22 against the biasing force of the biasing member 46 while the bicycle frame F is in a level, upright position. The operation cable 14 is often routed across the top or along a bottom of a bottom bracket shell of the bicycle frame F on an operating cable guide (not shown), which redirects the operation cable 14 upward along the bottom of a down tube of the bicycle frame F to the shifter in a conventional manner. Thus, in the first illustrated embodiment, the front derailleur 12 is a bottom-pull derailleur. Referring mainly to FIGS. 13 and 16, the input link 24 will now be discussed in further detail. The input link 24 basically includes a pivot portion 48 for pivotally attaching the input link 24 to the base member 16, and a connecting link coupling portion 50 for pivotally attaching the connecting link 26 to the input link 24. The input link 24 further includes a cable attachment part 52 that is configured to be attached to the operation cable 14. The input link 24 is pivotally supported relative to the base member 16 about the third pivot axis P3. In particular, the pivot portion 48 has a pivot axle receiving bore 48a for receiving the third pivot axle X3.

The bicycle front derailleur 12 further comprises at least one bearing member 54 disposed between the third pivot axis P3 and the input link 24. In the illustrated embodiment, the bicycle front derailleur 12 includes two bearing members 54 that are disposed on either side of the input link 24. In particular, the input link 24 includes a pair of recesses 48b that are located at opposite faces of the pivot portion 48 to receive the bearing members 54. Preferably, the bearing members 54 are either sealed bearings having inner and outer races with rolling members therebetween, or a single ring made of a material (e.g., nylon) having a lower coefficient of friction than the material (e.g., aluminum alloy) of the input link 24. Preferably, each of the bearing members 54 has a pivot axle receiving opening 54a for receiving the third pivot axle X3. The pivot axle receiving bore 48a is slightly larger than the pivot axle receiving openings 54a so that the third pivot axle X3 does not contact the input link 24.

As best seen in FIG. 13, the connecting link coupling portion 50 of the input link 24 is pivotally connected to one end of the connecting link 26 by the fourth pivot axle X4 to pivot about the fourth pivot axis P4. The other end of the connecting link 26 is pivotally connected to the extension link 44 by the fifth pivot axle X5 to pivot about the fifth pivot axis P5. The input link 24 and the extension link 44 are pivotally arranged with respect to the base member 16 such that the input link 24 and the connecting link 26 form an angle A defined by the third pivot axis P3, the fourth pivot axis P4 and the fifth pivot axis P5. The fourth pivot axis P4 is the vertex point of the angle A.

Figure 10:
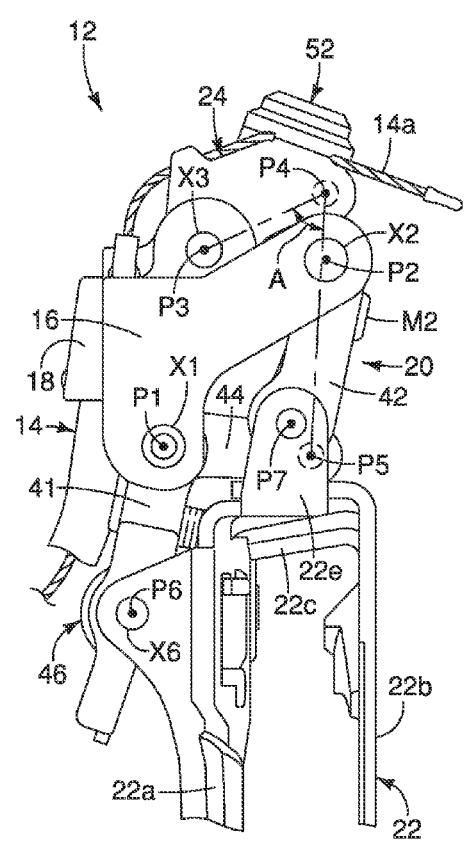
FIG. 10 is an enlarged rear elevational view of a portion of the front derailleur illustrated in FIGS. 1 to 9 with the chain guide in the retracted position.

Referring to FIGS. 10 and 12, during operation of the operation cable 14, the operation cable 14 pivots the input link 24, which pivots about the third pivot axis P3. As the input link 24 pivots about the third pivot axis P3, the connecting link 26 is pulled or pushed, which in turn pivots the extension link 44 about the first pivot axis P1. The extension link 44 then transfers this moving force to the first link 41, which shifts the chain guide 22 from the retracted position to the extended position, or vice versa.

Figure 11:
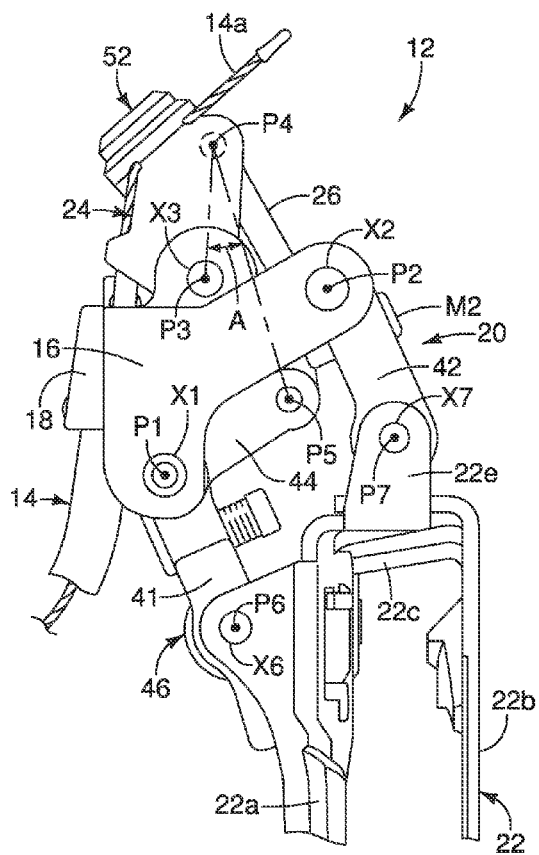
FIG. 11 is an enlarged rear elevational view of the front derailleur illustrated in FIGS. 1 to 10 with the chain guide in the extended position.

As seen in FIGS. 10, 12, and 13, the angle A is sixty degrees or more when the chain guide 22 is at the retracted position, in the illustrated embodiment, the angle A is sixty-three degrees. As seen in FIG. 11, when the chain guide 22 is in the extended position, the angle A is less than thirty degrees. In the illustrated embodiment, the angle A is about twenty degrees (i.e., 20.3°). Thus, the angle A changes more than thirty degrees when the chain guide 22 shifts between the retracted position and the extended position. More preferably, the angle A can also change more than forty degrees between the retracted position and the extended position. By this configuration, an actuation ratio when the chain guide 22 is located in the retracted position become much higher than an actuation ratio when the chain guide 22 is located in the extended position. The actuation ratio is explained later.

As seen in FIG. 13, in the illustrated embodiment, the cable attachment part 52 is disposed opposite to the outer casing receiving part 18 with respect to the third pivot axis P3 in a vertical direction. As seen in FIG. 16, the cable attachment part 52 includes a washer 52a, a fixing bolt 52b and a threaded bore 52c. The fixing bolt 52b includes a tool engagement structure (e.g., a hex recess) for tightening or loosening the fixing bolt 52b into the threaded bore 52c. Thus, the fixing bolt 52b screws into the threaded bore 52c. In this way, the input link 24 is configured to be connected to the operation cable 14 to move the input link 24 in response to operation of the operation cable 14. At the same time, the linkage assembly 20 moves in response to movement of the input link 24. In particular, during the operation of the operation cable 14, the input link 24 pivots with respect to the base member 16 about the third pivot axis P3, while the first and second links 41 and 42 of the linkage assembly 20 pivot with respect to the base member 16 about the first and second pivot axes P1 and P2, respectively, to move the chain guide 22 from the retracted position to the extended position. With this configuration, the input link 24 and the linkage assembly 20 are arranged such that the input link 24 pivots with respect to the base member 16 through a rotational angle of sixty degrees or more about the third pivot axis P3 to move the chain guide 22 from the retracted position to the extended position.

As best seen in FIGS. 12, 13 and 16, the connecting link 26 will now be discussed in greater detail. The connecting link 26 is pivotally connected to the input link 24 on the side of the input link 24 that is offset from the cable attachment part 52. As shown in FIG. 12, the connecting link 26 is pivotally connected to the input link 24 at the fourth pivot axis P4 by the fourth pivot axle X4. The connecting link 26 is pivotally connected to the extension link 44 at the fifth pivot axis P5 by the fifth pivot axle X5. The input link 24 includes a mounting hole 50a for receiving the fourth pivot axle X4. The extension link 44 includes a mounting hole 44a for receiving the fifth pivot axle X5.

Figure 17:
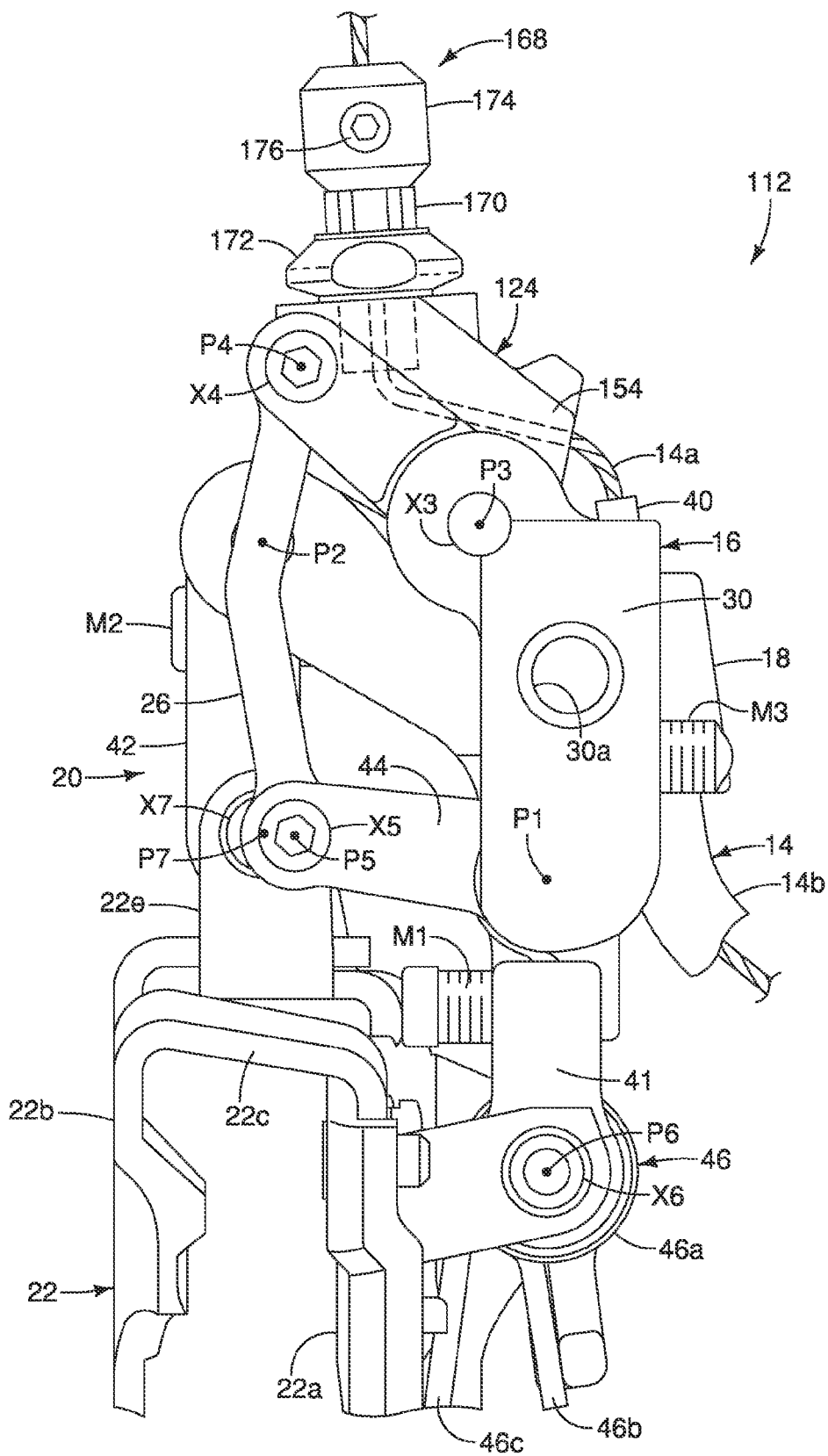
FIG. 17 is an enlarged front elevational view of the front derailleur illustrated in FIGS. 1 to 13, but with a modified input link that has a cable adjuster mounted thereon.

Referring now to FIG. 17, a modified bicycle front derailleur 112 will now be discussed. Basically, the bicycle front derailleur 112 is identical to the bicycle front derailleur 12, except that the input link 24 of the bicycle front derailleur 12 has been replaced with a modified input link 124 having a cable adjuster 168 for adjusting a tension of the inner wire 14a. In view of the similarity between the bicycle front derailleurs 12 and 112, the bicycle front derailleur 112 will only be briefly discussed for the sake of brevity. Moreover, the parts of the bicycle derailleur 112 which are identical or identical in function to the corresponding parts of the bicycle derailleur 12 will be given the same reference numbers.

In this modification, the input link 124 includes a cable adjuster 168 that is configured to adjust a tension of the operation cable 14. Thus, the input link 124 differs from the input link 24 in that the input link 124 includes the cable adjuster 168 instead of the cable attachment part 52. Thus, the cable adjuster 168 is disposed on the input link 124 where the cable attachment part 52 was mounted. The cable adjuster 168 is configured to receive the inner wire 14a of the operation cable 14 after the inner wire 14a passes through the outer casing receiving part 18. It will be apparent from this disclosure that the cable adjuster 168 is not limited to be disposed on the input link 124, it could be disposed on the outer casing receiving part 18, for example.

The cable adjuster 168 is a conventional cable adjuster. The cable adjuster 168 includes an adjuster bolt 170, an adjuster barrel or knob 172 and a fixing collar 174. The adjuster bolt 170 is screwed into a threaded bore of the input link 124. The adjuster knob 172 is disposed on the adjuster bolt 170, and arranged to rotate the adjuster bolt 170, upon adjuster knob 172 being rotated. The adjuster bolt 170 is configured to move linearly along the threaded bore of the input link 124. The fixing collar 174 is fixed to the inner wire 14a by a set screw 176. The fixing collar 174 acts as an abutment of the inner wire 14a. Thus, the inner wire 14a of the operation cable 14 enters the input link 124 through a wire receiving hole and exits out of a center bore of the adjuster bolt 170. The fixing collar 174 is attached to the inner wire 14a above the adjuster bolt 170. By tightening and loosening the set screw 176 into the fixing collar 174, the inner wire 14a can be fixed to the fixing collar 174 at different locations to set the initial tension in the inner wire 14a. After the initial setup, the adjuster knob 172 can be rotated to adjust the position of the adjuster bolt 170 with respect to the input link 124 to move the fixing collar 174 linearly upwards or downwards with respect to the input link 124. In this way, the cable tension is increased as the adjuster barrel 172 rotates counterclockwise and decreased as the adjuster barrel 172 rotates clockwise.

Figure 18:
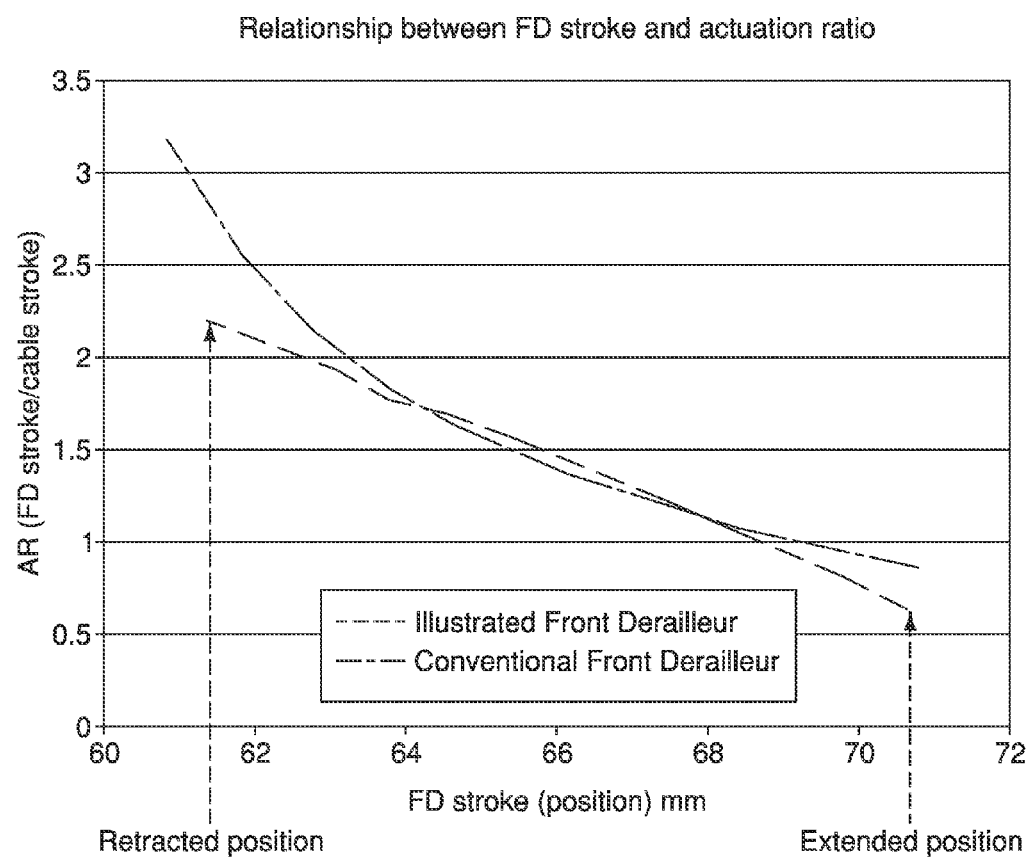
FIG. 18 is a line graph illustrating the relationship between one stroke of the front derailleur in accordance with the illustrated embodiment and the actuation ratio.

As shown in FIG. 18, the relationship between the actuation ratio AR (calculated by the length of the front derailleur (FD) stroke to the length of the cable stroke) and the front derailleur stroke (movement of the chain guide 22) for the present invention generates a flatter curve. The actuation ratio is defined in detail as an amount of movement of the chain guide 22 in the transverse direction per unit displacement of the operation cable 14. Thus, with the arrangement of the bicycle front derailleurs 12 and 112 of the present invention, the required force for an operator to shift from one bicycle chain sprocket to another is more consistent. Further, the actuation ratio of the front derailleurs 12 and 112, as illustrated, when the chain guide 22 is in extended position is less than the conventional front derailleur. As a result, the required force of the present invention for performing a shifting operation is less than the conventional front derailleur at an end of shifting operation.

Figure 19:
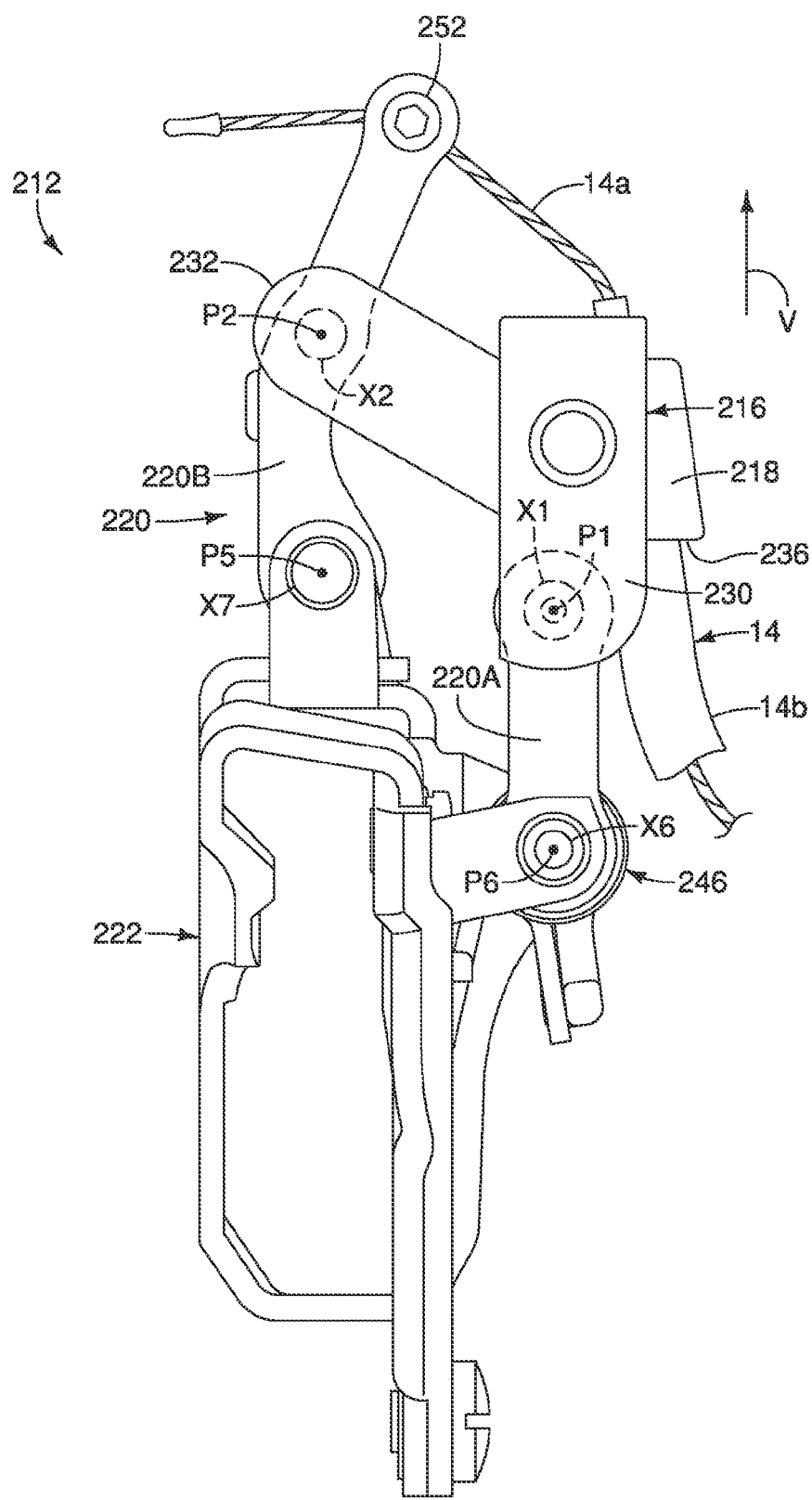
FIG. 19 is a front elevational view of a front derailleur in accordance with another modification.

Referring now to FIG. 19, a modified bicycle front derailleur 212 will now be discussed. Basically, the bicycle front derailleur 212 is a simplified version of the bicycle front derailleur 12 in that the bicycle front derailleur 212 doses not include the input link, connecting link, the extension link of the bicycle front derailleur 12. In view of the similarity between the bicycle front derailleurs 12 and 212, the bicycle front derailleur 212 will only be briefly discussed for the sake of brevity.

Here, the bicycle front derailleur 212 basically comprises a base member 216, an outer casing receiving part 218, a linkage assembly 220 and a chain guide 222. The outer casing receiving part 218 and the chain guide 222 are identical to the outer casing receiving part 18 and the chain guide 22, which are discussed above. Thus, the base member 216 and the outer casing receiving part 218 are an integral unit that is preferably a one-piece member as illustrated. The base member 216 is configured to be mounted to a bicycle frame in the same manner as discussed above with respect to the base member 16. The linkage assembly 220 includes a first link 220A and a second link 220B. The first link 220A is pivotally coupled to a bicycle mounting portion 230 of the base member 216 by a pivot axle X1. The second link 220B is pivotally coupled to an outer portion 232 of the base member 216 by a pivot axle X2. The chain guide 222 is pivotally coupled to the first and second links 220A and 220B to move between a retracted position and an extended position in the same manner as the first illustrated embodiment. In particular, similar to the first embodiment, the first link 220A is pivotally coupled to the chain guide 222 by a pivot axle X6, while the second link 220B is pivotally coupled to the chain guide 222 by a pivot axle X7. The pivot axles X1, X2, X6 and X7 define pivot axes P1, P2, P6 and P7 of a four-bar linkage. Preferably, the chain guide 222 is biased to the retracted position by a biasing member 246. The biasing member 246 is identical to the biasing member 46 and is disposed on the pivot axle X6.

The operation cable 14 is operatively coupled between the base member 216 and the second link 220B. The outer casing receiving part 218 of the base member 216 is configured to receive the outer casing 14b of the operation cable 14 through which the inner wire 14a passes. The outer casing receiving part 218 includes an inlet opening 236 into which the outer casing 14b is inserted. Similar to the first embodiment, the inlet opening facing downward with respect to the vertical direction V in a state where the base member 216 is mounted to the bicycle frame. The second link 220B is provided with a cable attachment part 252 that fixedly secures the inner wire 14a of the operation cable 14 to the second link 220B. Further, as similar to the first embodiment, the cable attachment part 252 or the outer casing receiving part 218 can include the cable adjuster 168 to adjust the tension of the inner wire 14a.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle front derailleur. Accordingly, these directional terms, as utilized to describe the bicycle front derailleur should be interpreted relative to a bicycle in an upright riding position on a horizontal surface and that is equipped with the bicycle front derailleur. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle front derailleur comprising:
   a base member configured to be mounted to a bicycle frame;
   a linkage assembly including a first link pivotally coupled to the base member at a first pivot axis, an extension link operatively coupled to the first link and pivotally coupled to the base member, and a second link pivotally coupled to the base member at a second pivot axis;
   a chain guide pivotally coupled to the first and second links to move between a retracted position and an extended position;
   an input link pivotally supported relative to the base member about a third pivot axis, the input link being configured to be connected to an operation cable to move the input link in response to operation of the operation cable;
   a connecting link pivotally connected to the input link about a fourth pivot axis and pivotally connected to the extension link about a fifth pivot axis such that the linkage assembly moves in response to movement of the input link; and
   an outer casing receiving part configured to receive an outer casing through which the operation cable passes, the outer casing receiving part having an outlet opening that faces upward with respect to a vertical direction in a state where the base member is mounted to the bicycle frame, the outer casing receiving part being disposed on the base member such that the outlet opening is disposed above the first pivot axis in a state where the base member is mounted to the bicycle frame.

2. The bicycle front derailleur according to claim 1, wherein
   the outer casing receiving part is disposed between the first pivot axis and the third pivot axis with respect to a vertical direction as viewed from an axial direction parallel to the first pivot axis.

3. The bicycle front derailleur according to claim 1, wherein
the base member includes an outer portion and an inner portion, the inner portion being disposed closer to the bicycle frame than the outer portion in a state where the base member is mounted to the bicycle frame, and
the outer casing receiving part is disposed on the inner portion of the base member.

4. The bicycle front derailleur according to claim 3, wherein
the outer casing receiving part at least partially protrudes from the inner portion toward the bicycle frame in the state where the base member is mounted to the bicycle frame.

5. The bicycle front derailleur according to claim 1, wherein
the input link includes a cable attachment part configured to be attached to the operation cable, and
the cable attachment part is disposed opposite to the outer casing receiving part with respect to the third pivot axis in a vertical direction.

6. A bicycle front derailleur comprising:
a base member configured to be mounted to a bicycle frame;
a linkage assembly including a first link pivotally coupled to the base member at a first pivot axis, an extension link operatively coupled to the first link and pivotally coupled to the base member, and a second link pivotally coupled to the base member at a second pivot axis;
a chain guide pivotally coupled to the first and second links to move between a retracted position and an extended position;
an input link pivotally supported relative to the base member about a third pivot axis, the input link being configured to be connected to an operation cable to move the input link in response to operation of the operation cable;
a connecting link pivotally connected to the input link about a fourth pivot axis and pivotally connected to the extension link about a fifth pivot axis such that the linkage assembly moves in response to movement of the input link, the extension link and the connecting link being configured such that the fourth pivot axis and the fifth pivot axis are spaced apart by a first distance that is longer than a second distance extending between the fifth pivot axis and first pivot axis; and
an outer casing receiving part configured to receive an outer casing through which the operation cable passes, the outer casing receiving part being disposed on the base member.

7. The bicycle front derailleur according to claim 1, further comprising
at least one bearing member disposed between the third pivot axis and the input link.

8. The bicycle front derailleur according to claim 1, wherein
the input link includes a cable adjuster configured to adjust a tension of the operation cable.

9. A bicycle front comprising:
a base member configured to be mounted to a bicycle frame;
a linkage assembly including a first link pivotally coupled to the base member at a first pivot axis, an extension link operatively coupled to the first link and pivotally coupled to the base member, and a second link pivotally coupled to the base member at a second pivot axis;
a chain guide pivotally coupled to the first and second links to move between a retracted position and an extended position;
an input link pivotally supported relative to the base member about a third pivot axis, the input link being configured to be connected to an operation cable to move the input link in response to operation of the operation cable;
a connecting link pivotally connected to the input link about a fourth pivot axis and pivotally connected to the extension link about a fifth pivot axis such that the linkage assembly moves in response to movement of the input link, the extension link and the connecting link being disposed closer to a downstream side of a chain running direction than the second link in a state where the base member is mounted to the bicycle frame; and
an outer casing receiving part configured to receive an outer casing through which the operation cable passes, the outer casing receiving part being disposed on the base member.

10. The bicycle front derailleur according to claim 1, wherein
the input link and the linkage assembly are arranged such that the input link pivots with respect to the base member through a rotational angle of sixty degrees or more about the third pivot axis to move the chain guide from the retracted position to the extended position.

11. The bicycle front derailleur according to claim 1, wherein
the input link and the extension link are pivotally arranged with respect to the base member such that the input link and the connecting link form an angle defined by the third pivot axis, the fourth pivot axis and the fifth pivot axis with the fourth pivot axis being a vertex point of the angle such that the angle is sixty degrees or more when the chain guide is at the retracted position.

12. The bicycle front derailleur according to claim 1, wherein
the input link and the extension link are pivotally arranged with respect to the base member such that the input link and the connecting link form an angle defined by the third pivot axis, the fourth pivot axis and the fifth pivot axis with the fourth pivot axis being a vertex point of the angle such that the angle is less than thirty degrees when the chain guide is at the extended position.

13. The bicycle front derailleur according to claim 1, wherein
the input link and the extension link are pivotally arranged with respect to the base member such that the input link and the connecting link form an angle defined by the third pivot axis, the fourth pivot axis and the fifth pivot axis with the fourth pivot axis being a vertex point of the angle such that the angle changes more than thirty degrees between the retracted position and the extended position.

14. The bicycle front derailleur according to claim 13, wherein
the angle changes more than forty degrees between the retracted position and the extended position.

15. The bicycle front derailleur according to claim 1, wherein
the outer casing receiving part includes an inlet opening into which the outer casing is inserted, and
the inlet opening facing downward with respect to a vertical direction in a state where the base member is mounted to the bicycle frame.

16. A bicycle front derailleur comprising:
a base member configured to be mounted to a bicycle frame;
a linkage assembly including a first link pivotally coupled to the base member at a first pivot axis and a second link pivotally coupled to the base member;
a chain guide pivotally coupled to the first and second links to move between a retracted position and an extended position; and
an outer casing receiving part configured to receive an outer casing through which an operation cable passes,
the outer casing receiving part including an inlet opening into which the outer casing is inserted, the outer casing receiving part having an outlet opening facing upward with respect to a vertical direction in a state where the base member is mounted to the bicycle frame, the outlet opening being disposed above the first pivot axis in the state where the base member is mounted to the bicycle frame, and
the inlet opening facing downward with respect to a vertical direction in a state where the base member is mounted to the bicycle frame.

\* \* \* \* \*